United States Patent
Kooiman et al.

(10) Patent No.: US 11,136,121 B1
(45) Date of Patent: Oct. 5, 2021

(54) SYSTEM FOR INTERNAL PAYLOAD EXTENSION AND RETRACTION WITH LOCKING MECHANISM

(71) Applicant: Bell Textron Inc., Fort Worth, TX (US)

(72) Inventors: James Everett Kooiman, Fort Worth, TX (US); Jeffrey Matthew Williams, Hudson Oaks, TX (US); Clegg Benjamin Brian Smith, Fort Worth, TX (US); Michael E. Rinehart, Euless, TX (US); Franklin Foster Caldwell, North Richland Hills, TX (US); Tjepke Heeringa, Dallas, TX (US)

(73) Assignee: Textron Innovations Inc., Fort Worth, TX (US)

( * ) Notice: Subject to any disclaimer, the term of this patent is extended or adjusted under 35 U.S.C. 154(b) by 12 days.

(21) Appl. No.: 16/841,007

(22) Filed: Apr. 6, 2020

(51) Int. Cl.
*B64D 1/06* (2006.01)
*B64C 27/26* (2006.01)

(52) U.S. Cl.
CPC ............... *B64D 1/06* (2013.01); *B64C 27/26* (2013.01)

(58) Field of Classification Search
CPC .. B64C 27/26; B64D 1/06; B64D 1/04; B64D 7/08; B64D 1/02; B64D 1/10
See application file for complete search history.

(56) References Cited

U.S. PATENT DOCUMENTS

| | | | | |
|---|---|---|---|---|
| 2,975,676 A | * | 3/1961 | Butler | F41A 23/20 89/1.803 |
| 4,333,384 A | * | 6/1982 | Arnold | B64D 1/06 244/137.4 |
| 4,681,013 A | * | 7/1987 | Farley | B64D 1/06 89/1.804 |
| 4,930,398 A | * | 6/1990 | Sharples | B64C 1/1407 244/129.5 |
| 6,536,711 B1 | * | 3/2003 | Conway, Jr. | B64C 3/48 244/129.5 |
| 6,663,047 B1 | * | 12/2003 | Arata | B64C 25/16 244/137.1 |
| 2009/0314893 A1 | * | 12/2009 | Lugaro | B64D 1/06 244/129.5 |
| 2018/0079482 A1 | * | 3/2018 | Ivans | B64C 1/00 |

\* cited by examiner

*Primary Examiner* — Assres H Woldemaryam
(74) *Attorney, Agent, or Firm* — Patent Capital Group

(57) ABSTRACT

A system is described and includes at least one track attached to an upper interior surface of a payload bay and extending along a bottom surface of a vehicle structure external to the payload bay, wherein the track comprises a horizontal flange; a rack moveably connected to the at least one track via at least one carrier assembly; and a payload actuator system for selectively extending the rack from the payload bay along the at least one track to a position from which payload carried by the rack may be safely deployed and retracting the rack into the payload bay along the at least one track.

20 Claims, 40 Drawing Sheets

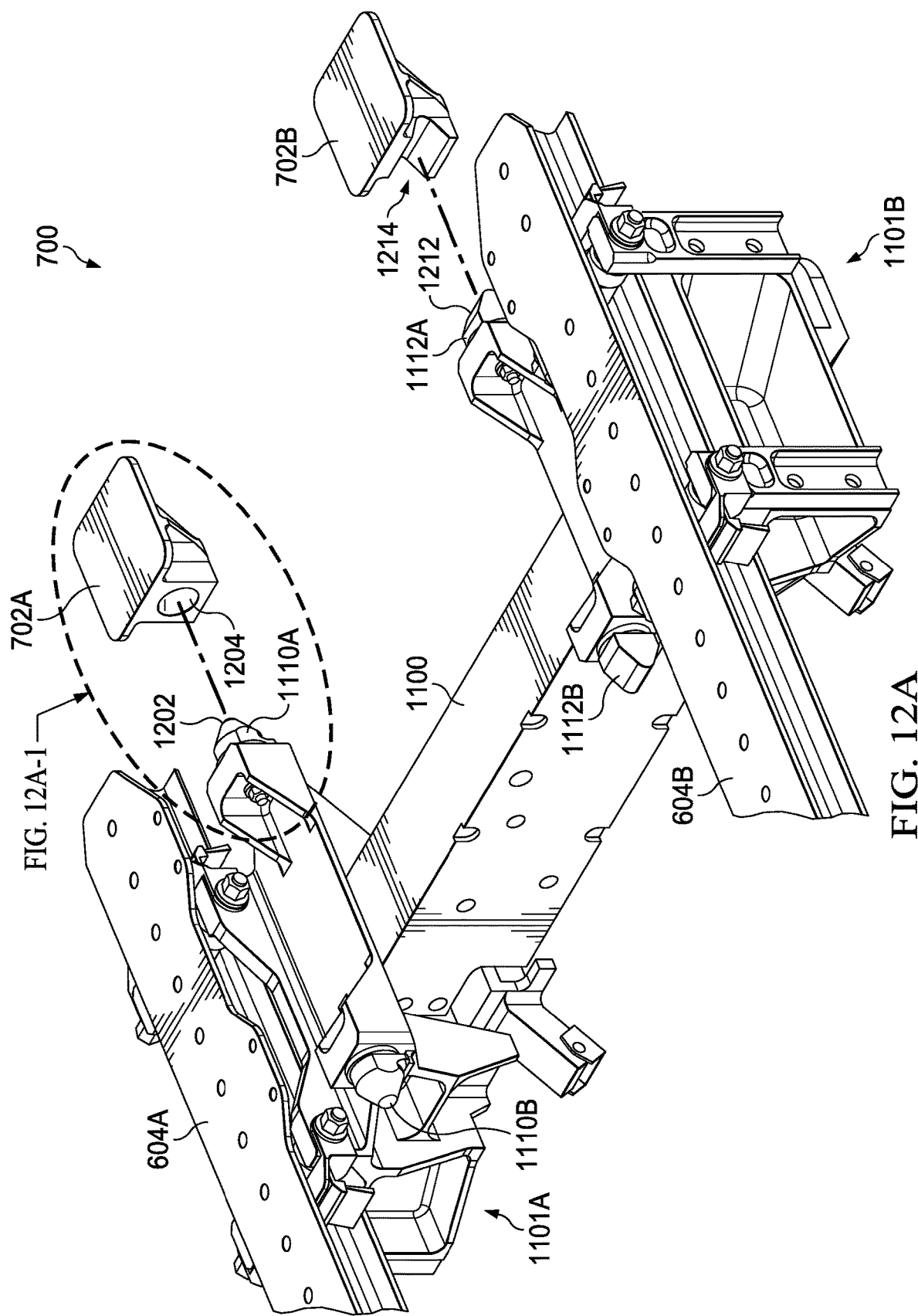

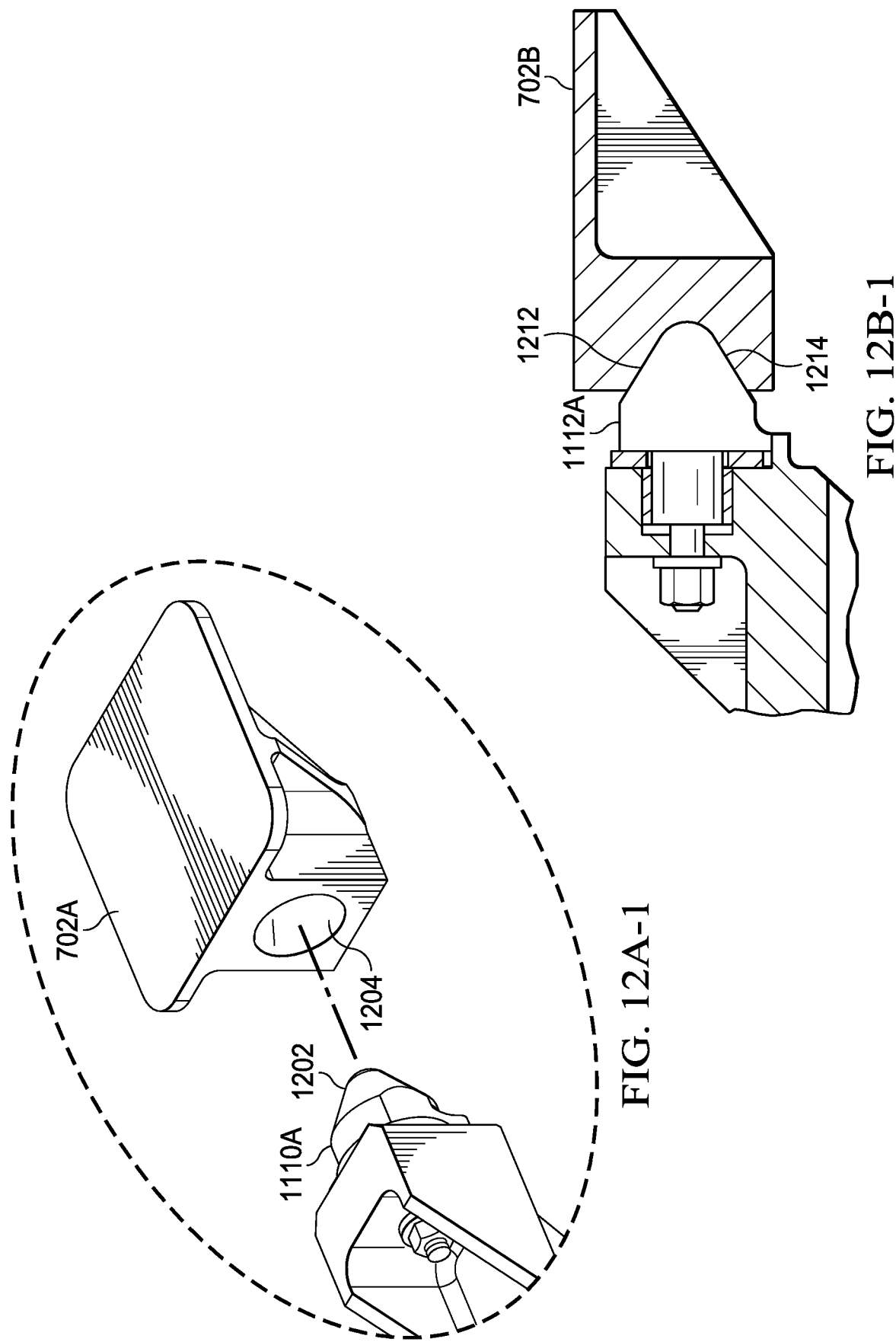

SYSTEM FOR INTERNAL PAYLOAD EXTENSION AND RETRACTION WITH LOCKING MECHANISM

TECHNICAL FIELD

This disclosure relates generally to aircraft devices and, more particularly, to a support structure and actuation mechanism for extending and retracting internally stored payload in such aircraft devices.

SUMMARY

One embodiment is a system comprising at least one track attached to an upper interior surface of a payload bay and extending along a bottom surface of a vehicle structure external to the payload bay, wherein the track comprises a horizontal flange; a rack moveably connected to the at least one track via at least one carrier assembly; and a payload actuator system for selectively extending the rack from the payload bay along the at least one track to a position from which payload carried by the rack may be safely deployed and retracting the rack into the payload bay along the at least one track.

Another embodiment is an aircraft comprising a payload bay for storing payload in a rack; at least one track attached to an upper interior surface of the payload bay and extending along a bottom surface of a wing of the aircraft, wherein the track comprises a horizontal flange and wherein the rack is connected to and linearly translatable along the at least one track via at least one carrier assembly; and a payload actuator system for selectively extending the rack from the payload bay along the at least one track to a position from which payload carried by the rack may be safely deployed and retracting the rack into the payload bay along the at least one track.

Yet another embodiment is a method comprising providing a track along an upper surface of an aircraft payload bay, wherein the track extends from the payload bay along a bottom surface of a wing of the aircraft, the track being embedded in a lower skin of the aircraft wing; moveably connecting a rack carrying payload to the track via a carrier assembly; selectively translating the rack between a first position in which the rack is fully stowed in the payload bay and a second position in which the rack is fully extended along the track beneath the aircraft wing; engaging a first locking mechanism provided between the track and the carrier assembly when the rack is in the first position; and engaging a second locking mechanism provided between the track and the carrier assembly when the rack is in the second position.

BRIEF DESCRIPTION OF THE DRAWINGS

To provide a more complete understanding of the present disclosure and features and advantages thereof, reference is made to the following description, taken in conjunction with the accompanying figures, in which like reference numerals represent like elements:

FIGS. 12A, 12A-1, 12B, and 12B-1 illustrate additional details in connection with the embodiment of a mechanism for implementing internal payload extension and retraction shown in FIG. 11;

DETAILED DESCRIPTION

Figure 1:
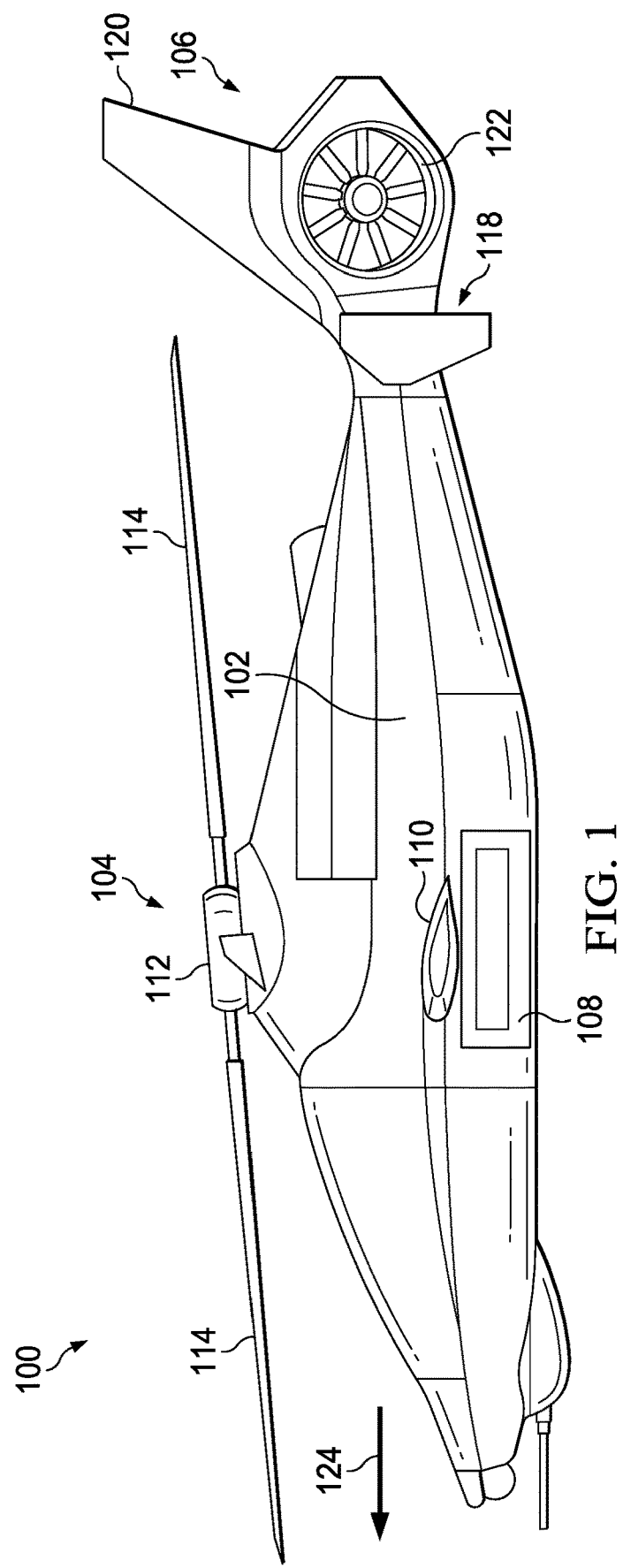
FIG. 1 illustrates a side view of an example aircraft in accordance with certain embodiments of the present disclosure for a mechanism for implementing internal payload extension and retraction.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions may be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature) of an element, operations, and/or conditions, the phrase "between X and Y" represents a range that includes X and Y.

Further, as referred to herein in this Specification, the terms "forward", "aft", "inboard", and "outboard" may be used to describe relative relationship(s) between components and/or spatial orientation of aspect(s) of a component or components. The term "forward" may refer to a special direction that is closer to a front of an aircraft relative to another component or component aspect(s). The term "aft" may refer to a special direction that is closer to a rear of an aircraft relative to another component or component aspect(s). The term "inboard" may refer to a location of a component that is within the fuselage of an aircraft and/or a spatial direction that is closer to or along a centerline of the aircraft relative to another component or component aspect(s), wherein the centerline runs in a between the front and the rear of the aircraft. The term "outboard" may refer to a location of a component that is outside the fuselage-of an aircraft and/or a special direction that farther from the centerline of the aircraft relative to another component or component aspect(s).

Still further, the present disclosure may repeat reference numerals and/or letters in the various examples. This repetition is for the purpose of simplicity and clarity and does not in itself dictate a relationship between the various embodiments and/or configurations discussed. Example embodiments that may be used to implement the features and functionality of this disclosure will now be described with more particular reference to the accompanying FIGURES.

Embodiments described herein provide a support structure and an actuation mechanism for extension of payload (which in certain embodiments comprises weapons) stowed in a payload bay of an aircraft fuselage outboard away from the fuselage to a firing position and for retraction of remaining payload back into the payload bay. Embodiments enable payload to remain level and oriented in the same direction when extended and while stowed and enable load reaction between the payload and support rails to remain consistent and without rotation.

The design is lightweight and capitalizes on the primary structure of an aircraft (e.g., wings and fuselage torque box) to support the payload for all load conditions. In accordance with features of embodiments described herein, tracks are attached to an upper surface (e.g., a ceiling) of the interior of the payload bay and are imbedded in lower wing skin to reduce drag when payload is stowed, resulting in minimal impact to aerodynamic performance of the wings. Locks may be employed at fully extended and fully retracted positions to help react hangfire and crash loads and to remove free-play from the mechanism. A variety of configurations may be used for the payload bay door and payload actuation. Off the shelf bomb rack units (BRUs) may be used for payload jettison.

Referring to FIG. 1, illustrated therein is an example embodiment of an aircraft, which in the illustrated example is a rotorcraft 100. FIG. 1 portrays a side view of rotorcraft 100, which includes a fuselage 102, a primary rotor system 104, and an empennage 106. The fuselage 102 is the main body of the rotorcraft 100, which may include a cabin (e.g., for crew, passengers, and/or cargo) and/or may house certain mechanical components, electrical components, etc. (e.g., engine(s), transmission, flight controls, etc.). In accordance with features of embodiments described herein, the fuselage 102 also includes a payload bay covered by a payload bay door 108 disposed under a wing 110, which in some embodiments includes a support structure and actuation mechanism for extending externally stowed payload (e.g., weapons) outboard away from the fuselage 102 to a firing position. It will be recognized that, although not shown in the view illustrated in FIG. 1, the opposite side of the rotorcraft 100 also includes a wing and a payload bay door corresponding to the wing 110 and payload bay door 108.

The rotor system 104 is used to generate lift for rotorcraft 100. For example, the rotor system 104 (also generally referred to as the "rotor") may include a rotor hub 112 (also referred to as a "rotor hub assembly" or more generally as a "hub") coupled to a plurality of rotor blades 114 (also referred to generally as "blades"). Torque generated by the engine(s) of the rotorcraft causes the rotor blades 114 to rotate, which generates lift. The empennage 106 of the rotorcraft 100 includes a horizontal stabilizer 118, a vertical stabilizer 120, and a tail rotor or anti-torque system 122. Although not shown in the view illustrated in FIG. 1, a corresponding horizontal stabilizer is disposed on the other side of the rotorcraft 100 opposite the horizontal stabilizer 118. The horizontal stabilizer 118 and vertical stabilizer 120 respectively provide horizontal and vertical stability for the rotorcraft 100. Moreover, tail rotor or anti-torque system 122 may be used to provide anti-torque and/or direction control for the rotorcraft 100.

Rotorcraft 100 relies on rotor system 104 for flight capabilities, such as controlling (e.g., managing and/or adjusting) flight direction, thrust, and lift of the rotorcraft. For example, the pitch of each rotor blade 114 can be controlled using collective control or cyclic control to selectively control direction, thrust, and lift of the rotorcraft 100. During collective control, all the of rotor blades 114 are collectively pitched together (e.g., the pitch angle is the same for all blades), which effects overall thrust and lift. During cyclic control, the pitch angle of each of the rotor blades 114 varies depending on where each blade is within a cycle of rotation (e.g., at some points in the rotation the pitch angle is not the same for all blades), which can affect direction of travel of the rotorcraft 100.

Aircraft such as rotorcraft 100 can be subjected to various aerodynamic and operational forces during operation, such as lift, drag, centrifugal force, aerodynamic shears, and so forth. Lift and centrifugal force, for example, are forces produced by the rotation of a rotor system. Lift is an upward force that allows a rotorcraft to elevate, while centrifugal force is a lateral force that tends to pull the rotor blades outward from the rotor hub. These forces can subject the rotor hub, rotor yoke, and/or the rotor blades (referred to herein using the terms "hub/blades", "yoke/blades", "hub/yoke/blades", and variations thereof) to flapping, leading and lagging, and/or bending. For example, flapping is a result of the dissymmetry of lift produced by rotor blades at different positions (typically referred to as "pitch" or "pitch angles") during a single rotation. During rotation, for example, a rotor blade may generate more lift while advancing in the direction of travel of the rotorcraft than while retreating in the opposite direction. A rotor blade may be flapped up (also sometimes referred to as being pitched "nose-up") while advancing in the direction of travel, and may flap down (e.g., pitched "nose-down") while retreating in the opposite direction. When a blade is pitched more nose-up, more lift is created on that blade, which will drag the side of the rotor/hub upward, which makes the hub/yoke flap. For example, for rotorcraft 100, the most aft blade (e.g., nearest to tail rotor or anti-torque system 122) of the rotor system 104 may be pitched more nose-up and the most forward blade may be pitched more nose-down; to provide a forward direction of travel (as generally indicated by arrow 124) for rotorcraft 100.

Figure 2A:
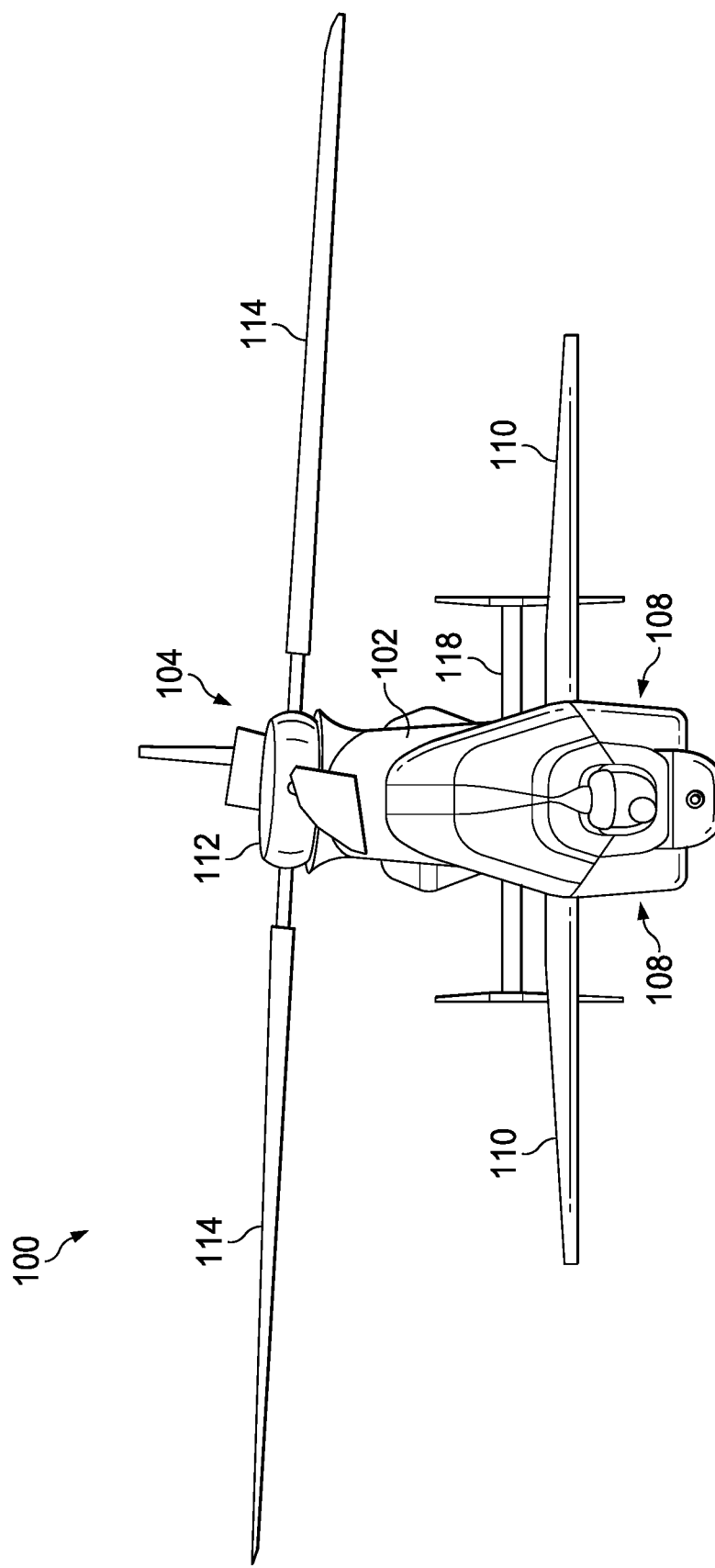
FIG. 2A illustrates a front plan view of the aircraft of FIG. 1 in which payload is retracted and stowed in payload bay.
Figure 2B:
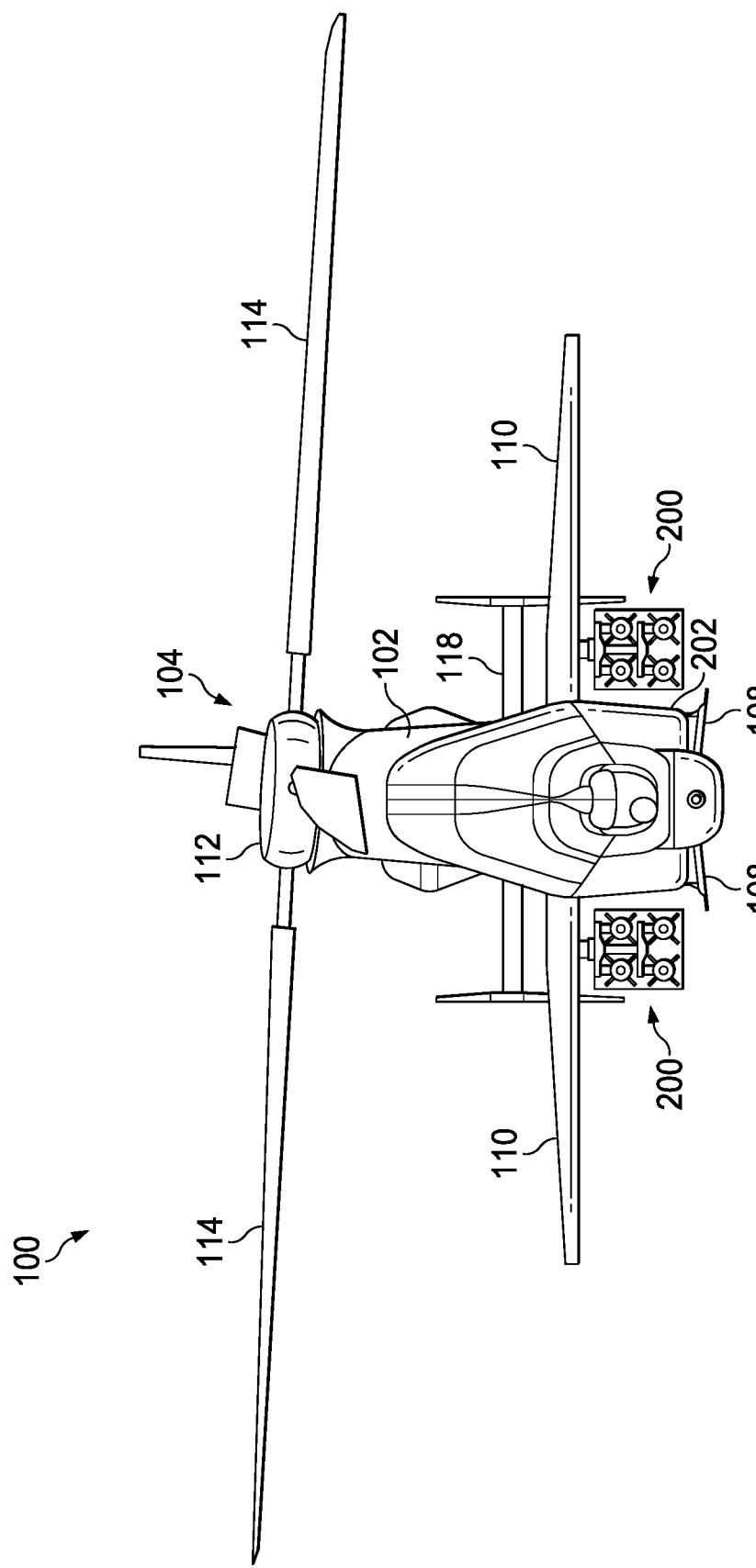
FIG. 2B illustrates a front plan view of the aircraft of FIG. 1 in which payload is extended.

Referring now to FIGS. 2A and 2B, illustrated therein are front plan views of the rotorcraft 100 of FIG. 1. FIG. 2A illustrates the rotorcraft 100 in a first condition in which the payload bay doors 108 are closed and payload is stowed within respective payload bays. FIG. 2B illustrates the rotorcraft 100 in a second condition in which the payload bay doors 108 are open and payload 200 is extended from the payload bays 202 beneath the wings 110.

Figure 3:
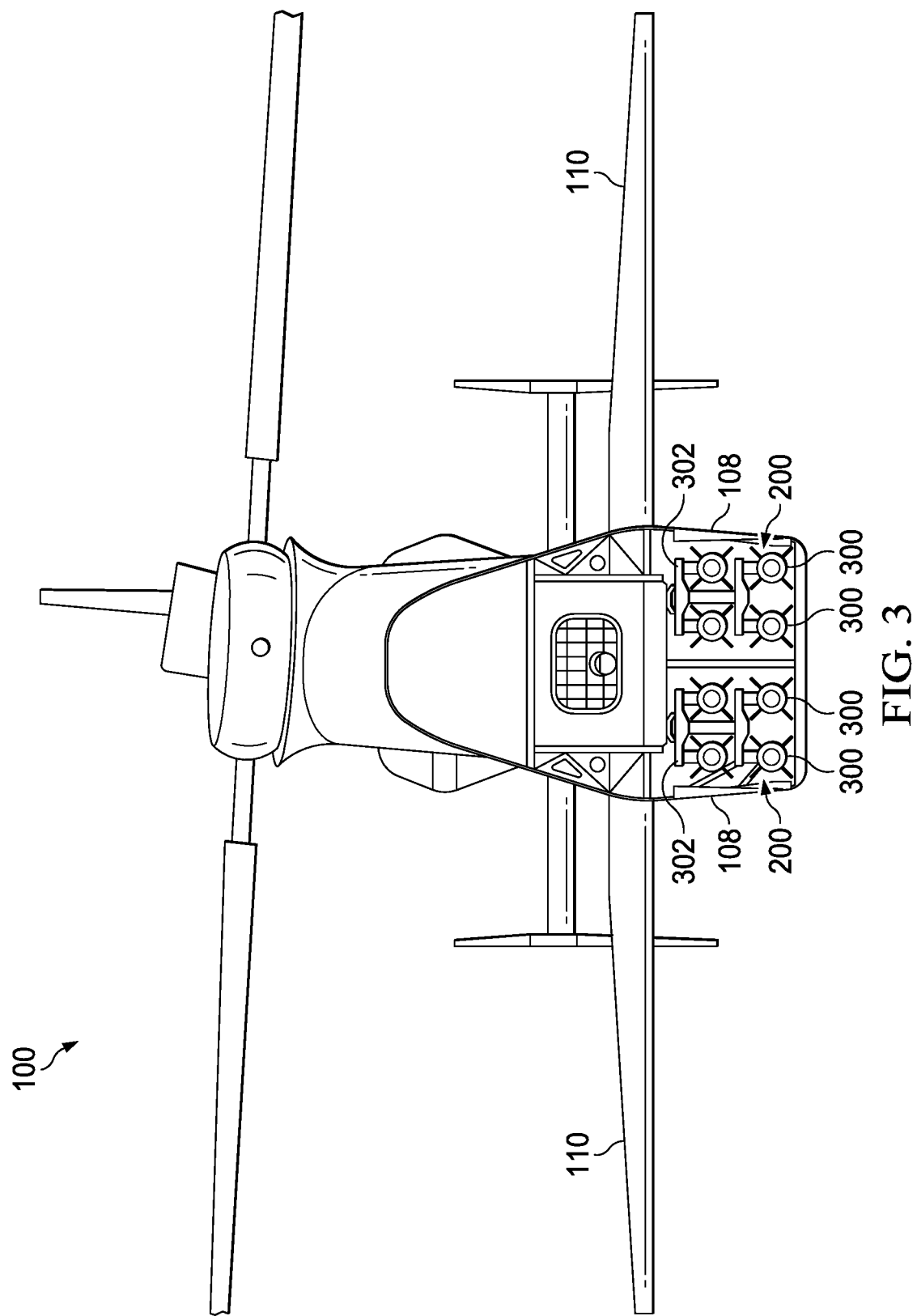
FIG. 3 is a front cross-sectional view of the aircraft of FIG. 1 in which payload is retracted and stowed in payload bay.

FIG. 3 illustrates a front cross-sectional view of the rotorcraft 100 taken just fore of the payload bays 202 in the same condition illustrated in FIG. 2A (doors 108 closed and payload 200 stowed). As shown in FIG. 3, payload 200 may comprise eight air-to-surface weapons (e.g., missiles, bombs, or other munitions) 300 stowed in a munitions launcher 302. In certain embodiments, munitions launchers 302 are implemented to suspend and release airborne weapons, such as weapons 300, from aircraft.

It will be noted that, while payload 200 is illustrated as comprising eight weapons, embodiments described herein are not limited to this configuration and are applicable to payloads comprising more or fewer weapons, depending on the space available in the payload bay. Moreover, the payload 200 is not limited to weapons and could additionally and/or alternatively include fuel, air-launched drones, sensor packages, rockets, jammers, etc.

Figure 4A:
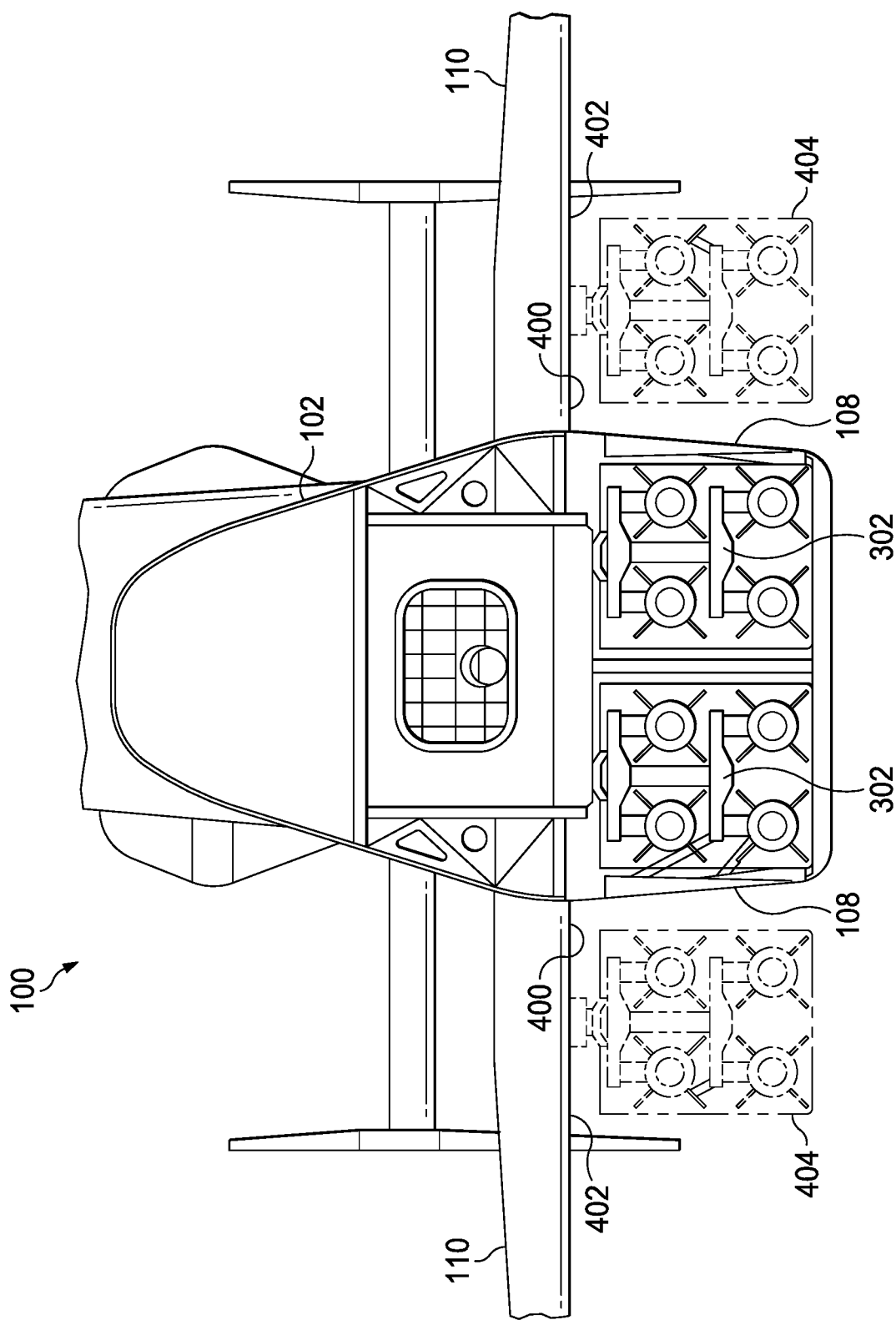
FIG. 4A is a front cross-sectional view of the aircraft of FIG. 1 showing the contrast between a payload stowed condition and a payload extended condition.

FIG. 4A illustrates another front cross-sectional view of the rotorcraft 100 taken just fore of the payload bays 202. FIG. 4A depicts the contrast between a first condition of the rotorcraft 100, in which the payload 200 is stowed in a respective one of payload bays 202, and a second condition of the rotorcraft 100 (illustrated in dashed lines), in which the payload 200 is fully extended and suspended from tracks 400 embedded in lower skins 402 of wings 110. As illustrated in FIG. 4A, in certain embodiments in which the racks 302 are designed to accommodate four Hellfire air-to-surface missiles (ASMs) each, a height of an inner mold line (IML) 404 of each payload 200 is approximately 27.5" and a width thereof is approximately 24" and a distance between a fully retracted (or stowed) position and a fully extended position of each payload 200 may be approximately 32".

Figure 4B:
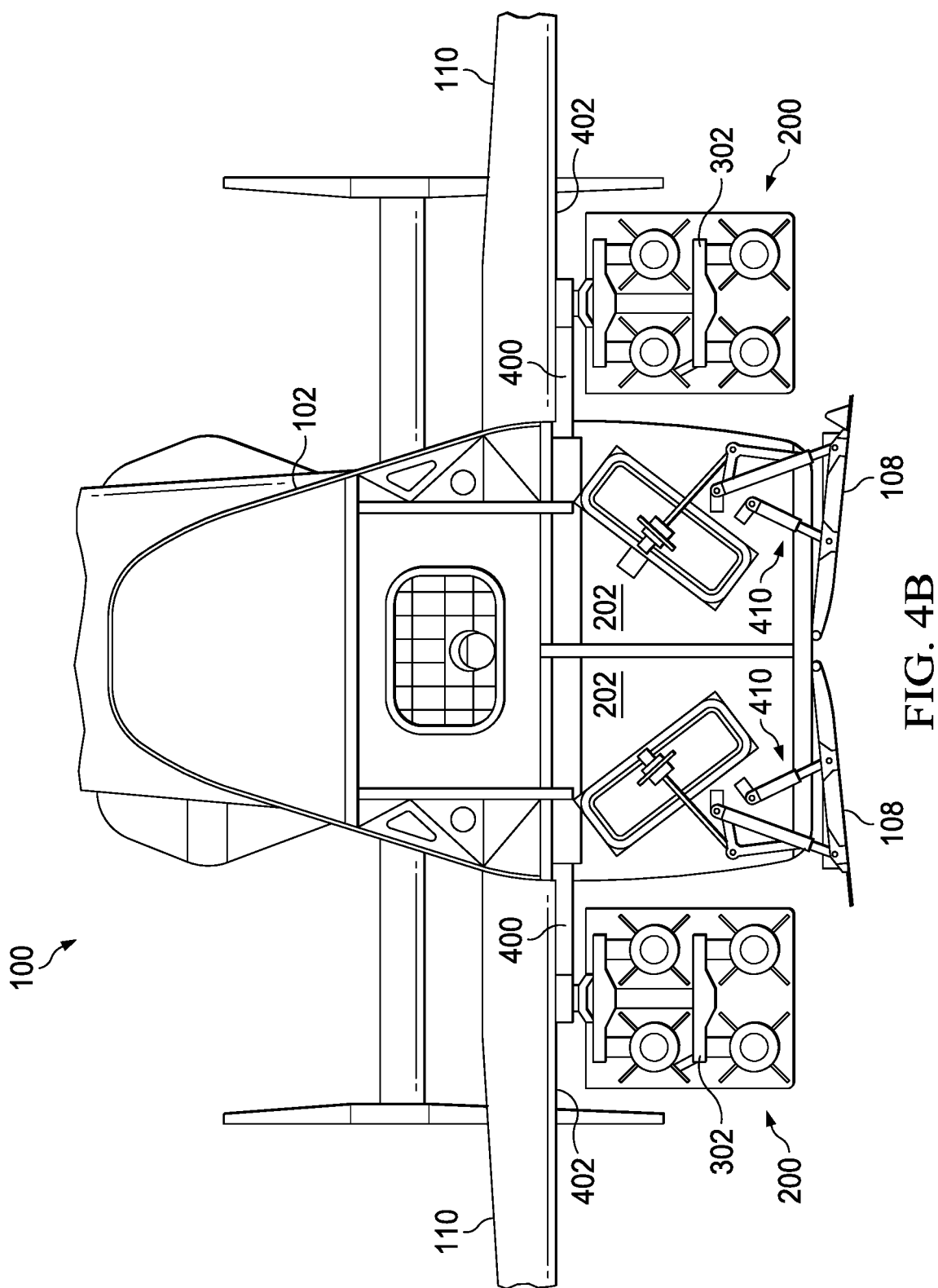
FIG. 4B is a front cross-sectional view of the aircraft of FIG. 1 in which the payload is extended outward below wings of the aircraft.

FIG. 4B illustrates yet another front cross-sectional view of the rotorcraft 100 taken just fore of the payload bays 202 in the same condition illustrated in FIG. 2B (doors 108 open and payload 200 extended). In particular, as illustrated in FIG. 4B, the payload 200 is fully extended and suspended from tracks 400 embedded in lower skins 402 of wings 110. As will be described in greater detail hereinbelow, rotorcraft 100 includes door actuation mechanisms 410 for opening payload bay doors 108 to allow for extension of payload 200 and for closing payload bay doors 108 when payload 200 are retracted into payload bays 202. Additionally, as will be shown and described in greater detail hereinbelow, rotorcraft 100 includes payload actuation mechanisms for selectively extending payload 200 along tracks 400 embedded in lower skins 402 of wings and retracting payload 200 back into payload bays 202 along the same tracks.

Figure 5A:
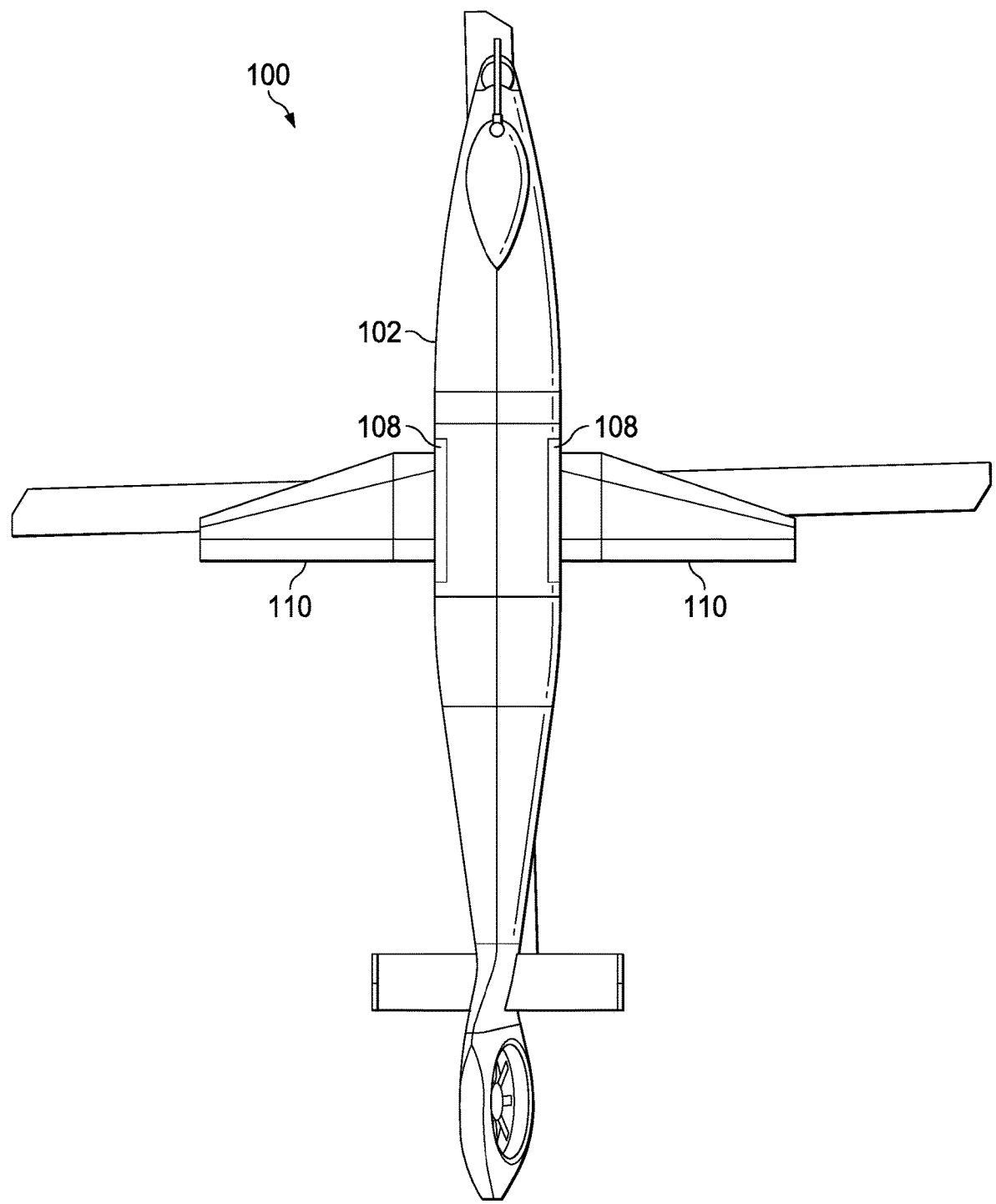
FIG. 5A is a bottom plan view of the aircraft of FIG. 1 in which payload is retracted and stowed in payload bay.
Figure 5B:
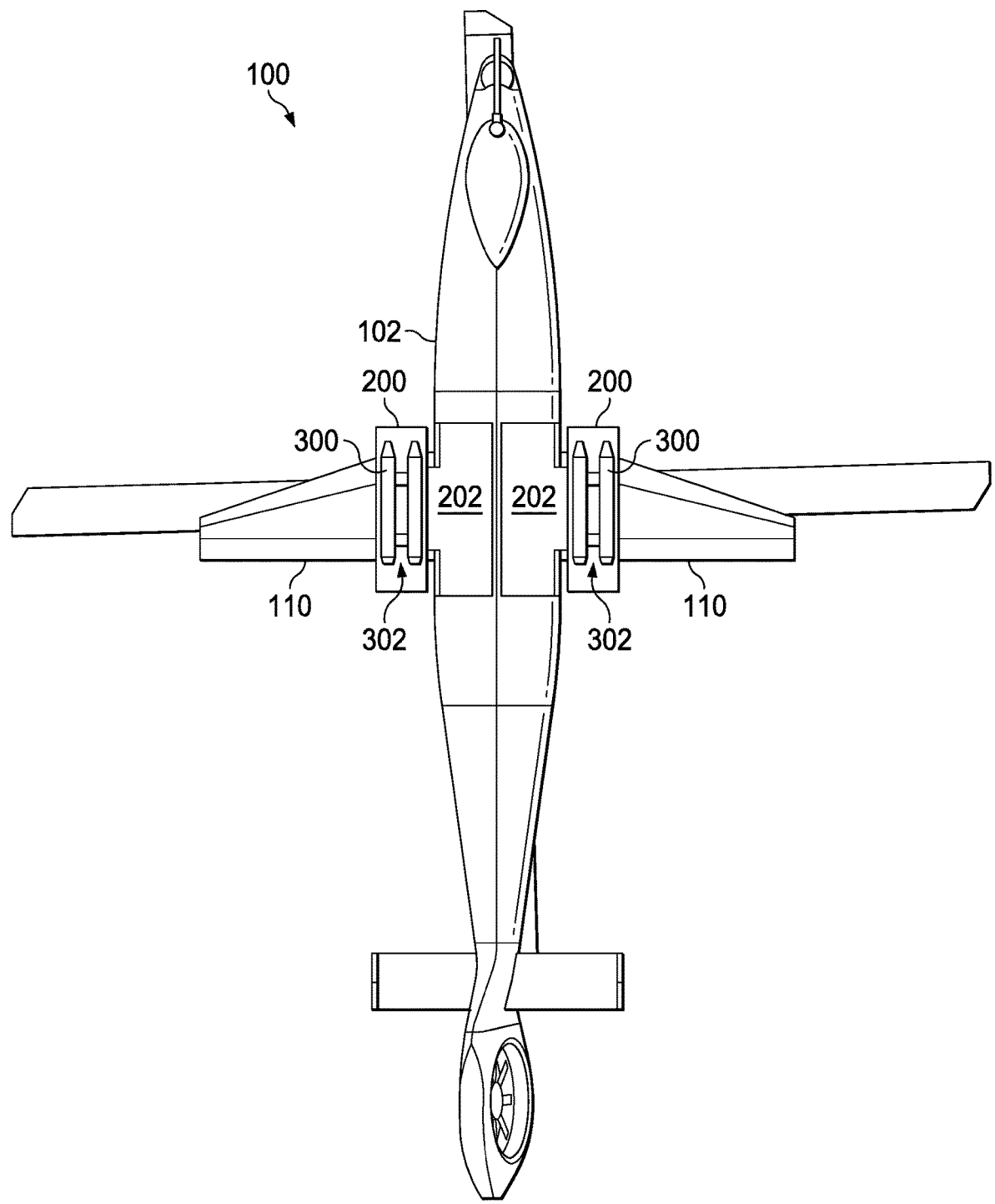
FIG. 5B is a bottom plan view of the aircraft of FIG. 1 in which payload is extended.

Referring now to FIGS. 5A and 5B, illustrated therein are bottom plan views of the rotorcraft 100 of FIG. 1. FIG. 5A illustrates the rotorcraft 100 in a first condition in which the payload bay doors 108 are closed and payload is stowed within payload bay. FIG. 5B illustrates the rotorcraft 100 in a second condition in which the payload bay doors 108 are open and payload 200 is extended from the payload bays 202 beneath the wings 110 along tracks 400 disposed on a lower skin 404 of wings.

Figure 6:
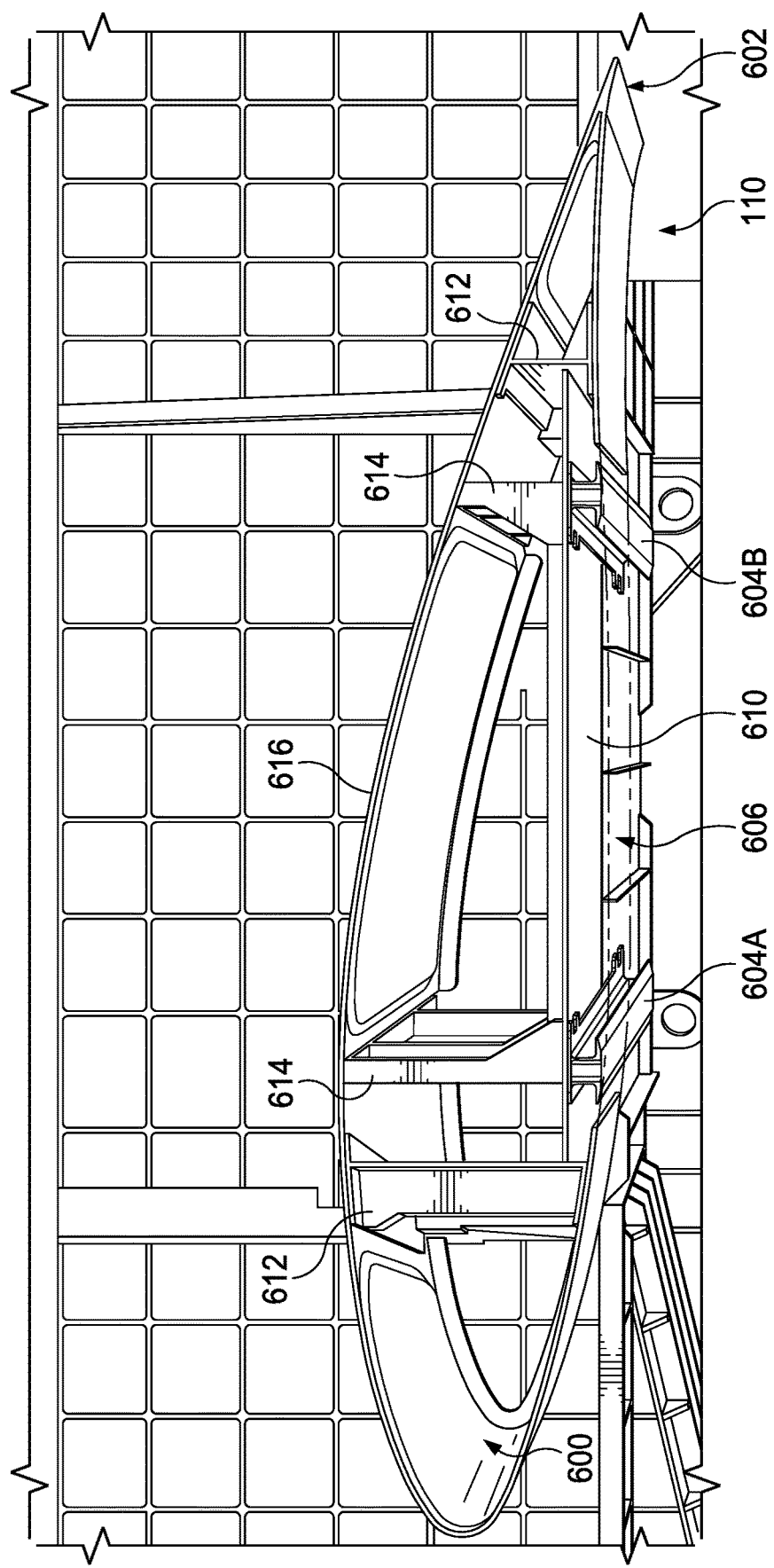
FIG. 6 illustrates payload and wing support structure in accordance with certain embodiments of the present disclosure for a mechanism for implementing internal payload extension and retraction.

Referring now to FIG. 6, illustrated therein is a cross-sectional side view of one of the wings 110, which includes a leading edge 600 and a trailing edge 602. As shown in FIG. 6, as previously described, a forward track 604A and an aft track 604B (which are equivalent to and comprise a portion of tracks 400 shown in FIG. 4A) are embedded inside an outer mold line (OML) 606 of wing 110. In accordance with features of one embodiment, lower skin of the wing 110 is removed (or omitted) to accommodate tracks 604A and 604B and other elements of the payload extension/retraction mechanism described herein. A support panel 610 is provided to which tracks 604A and 604B are attached. The support panel 610 connects directly to the lower panel of the fuselage torque box and replaces the lower surface of the wing in the area in which the tracks are installed and as such is situated a small distance (e.g., approximately one inch) above the wing OML 606. Wing spars 612 are provided for carrying flight loads and track spars 614 are provided for supporting tracks and payload loads as the payload moves along the tracks 604A, 604B. The leading edge and trailing edges 600, 602, may comprise one or more panels constructed from carbon epoxy with a honeycomb core. An upper skin 616 may also be constructed from carbon epoxy with a honeycomb core. Spars 612 and 614 and support panel 610 may be constructed from an aluminum alloy. The tracks 604A, 604B, may be constructed from steel and share fasteners with the track spars 614. In an example embodiment, the support panel 610 is sandwiched between the tracks 604A, 604B, and the track spars 614.

Figure 7A:
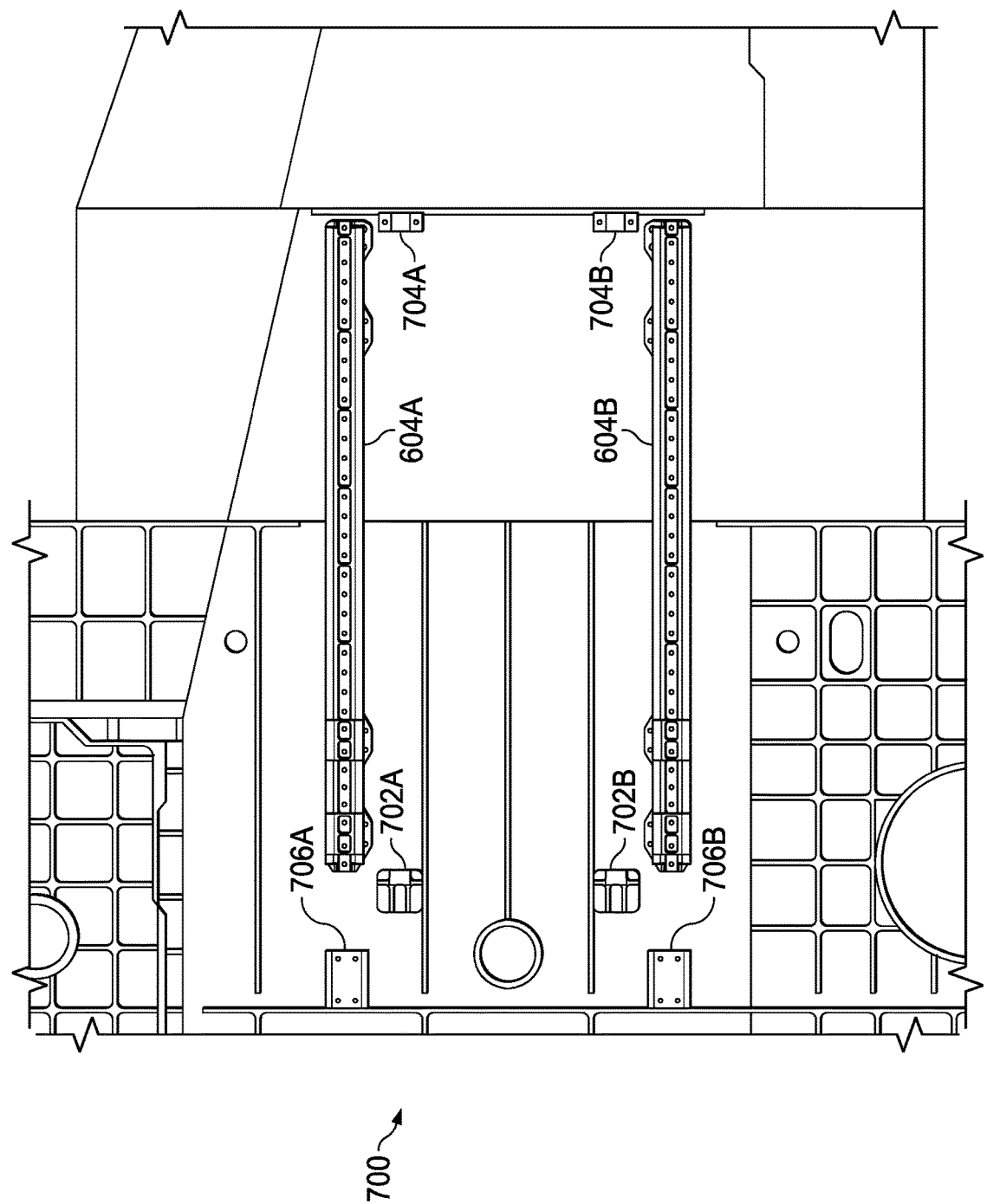
FIGS. 7A-7D illustrate a variety of views of tracks and locking structures in accordance with certain embodiments of the present disclosure for a mechanism for implementing internal payload extension and retraction.

FIG. 7A is a more detailed illustration of a payload extension/retraction mechanism 700 for an aircraft, such as rotorcraft 100, for implementing features of embodiments described herein. It will be recognized that the view shown in FIG. 7A is a cross-sectional view directed up from a bottom of payload bay, with the corresponding payload door and payload omitted from the view for the sake of clarity. As shown in FIG. 7A, the mechanism 700 includes forward and aft tracks 604A, 604B (as shown in FIG. 6), as well as forward and aft inboard locks 702A, 702B, and forward and aft outboard locks 704A, 704B, the function, purposes, and configurations of which will be described in greater detail below. The mechanism 700 further includes forward and aft actuator mount fittings 706A, 706B, that attach the actuators (e.g., actuator assemblies 1120A, 1120B, FIG. 11) to the fuselage, keep the actuators aligned to the tracks, transfer load from the actuators into the fuselage, and keep the actuators (forward and aft) aligned to one another.

Figure 7B:
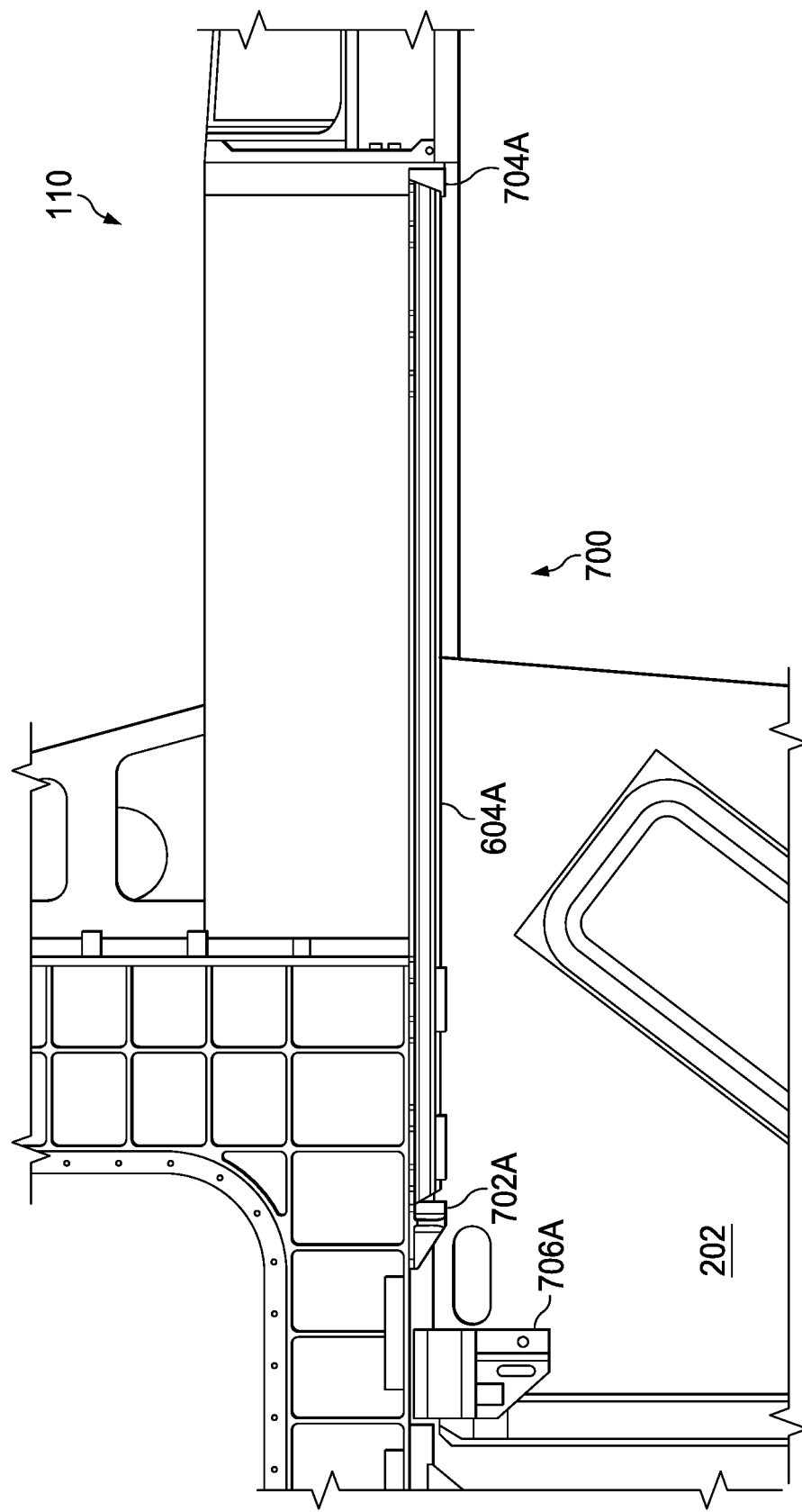

FIG. 7B illustrates another view of the payload extension/retraction mechanism 700 shown in FIG. 7A. It will be recognized that the view shown in FIG. 7B is a cross-sectional view directed aft from just in front of payload bay, with the corresponding payload door and payload omitted from the view for the sake of clarity. FIG. 7B illustrates forward track 604A, as well as forward inboard and outboard locks 702A, 704A, and forward actuator mount fitting 706A.

Figure 7C:
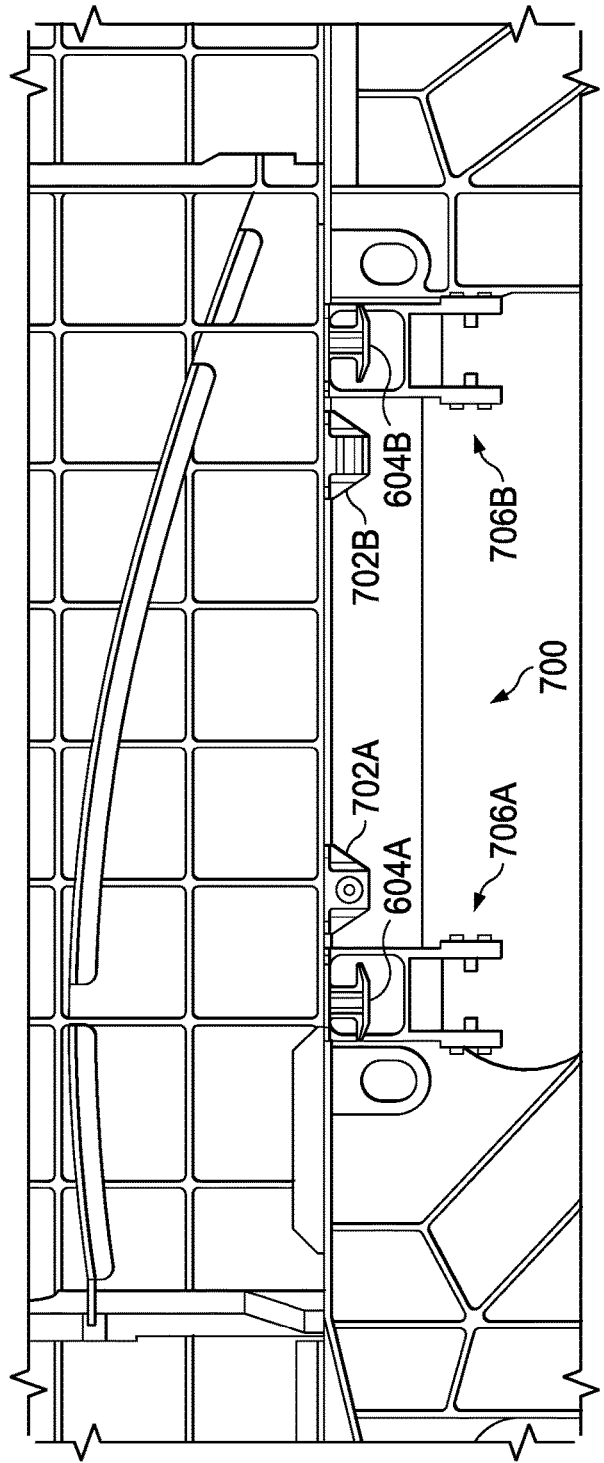

FIG. 7C illustrates yet another view of the payload extension/retraction mechanism 700 shown in FIGS. 7A and 7B. It will be recognized that the view shown in FIG. 7C is a cross-sectional view directed inboard from an outboard edge of payload bay, with the corresponding payload door and payload omitted from the view for the sake of clarity. FIG. 7C illustrates forward track and aft tracks 604A, 604B, as well as forward and aft inboard locks 702A, 702B and forward and aft actuator mount fittings 706A, 706B.

Figure 7D:
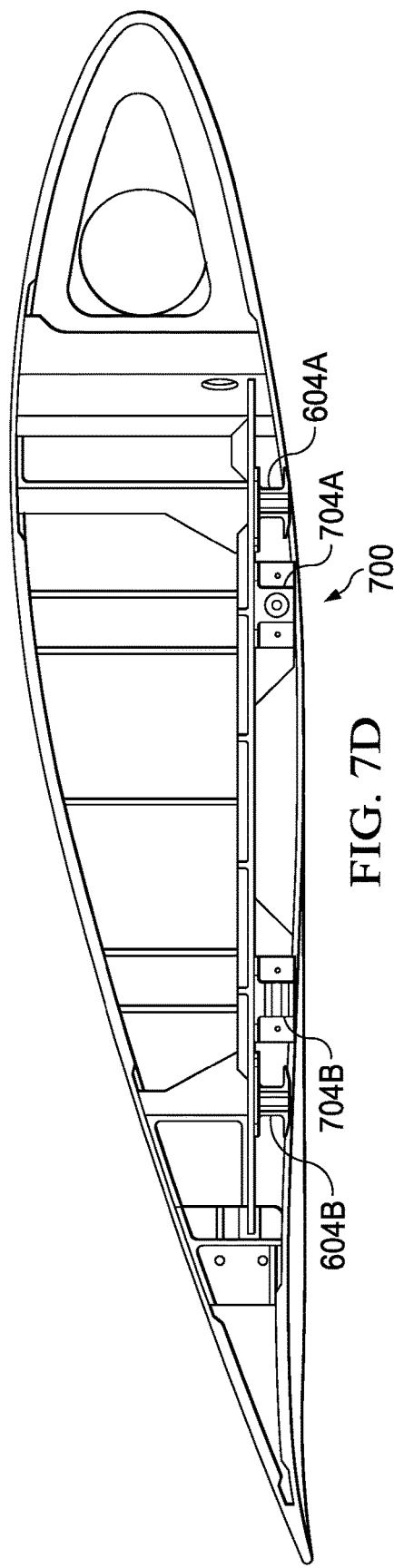

FIG. 7D illustrates another view of the payload extension/retraction mechanism 700 shown in FIG. 7A. It will be recognized that the view shown in FIG. 7D is a cross-sectional view directed outboard from an outboard edge of payload bay, with the corresponding payload door and payload omitted from the view for the sake of clarity. FIG. 7D illustrates forward and aft tracks 604A, 604B, as well as forward and aft outboard locks 704A, 704B.

Figure 8:
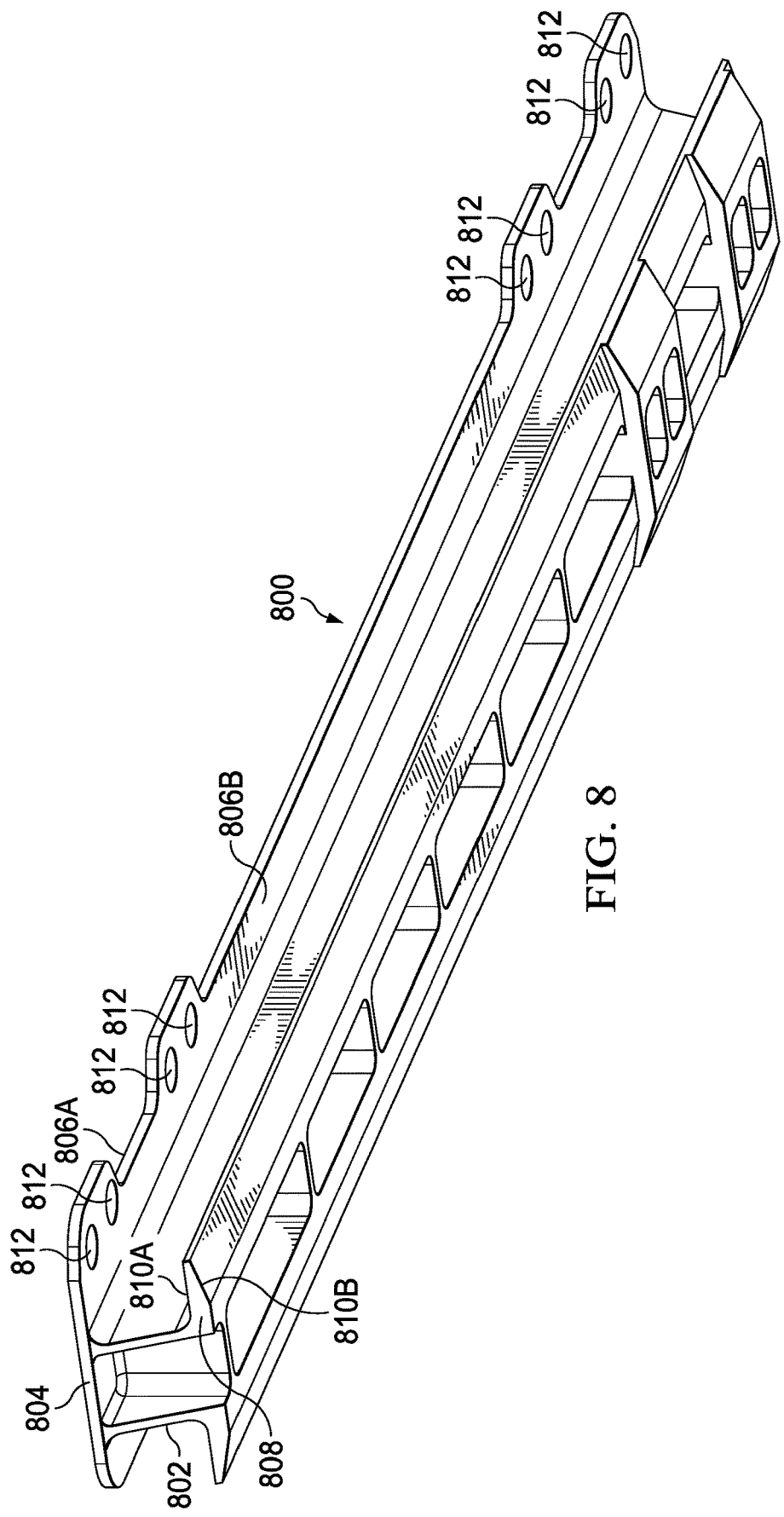
FIG. 8 is a perspective view of a track, such as the track shown in FIGS. 7A-7D.

FIG. 8 is a perspective view of a track 800, which may be used to implement any of tracks 400, 604A, 604B, shown in the above-described drawings, in accordance with features of embodiments described herein. As shown in FIG. 8, track 800 is substantially I-beam shaped and includes a web 802, an upper flange 804 having a top surface 806A and a bottom surface 806B, and a lower flange 808 having a top surface 810A and a bottom surface 810B. In certain embodiments, track 800 is made of steel. The distance between the bottom surface 806B of the upper flange 804 and the top surface 810A of the lower flange 808 may be determined by the diameter of the track roller (e.g., 0.875 inches). In certain embodiments, the length of the track 800 is 42 inches, the width of the track is 3 inches, and the height of the track is 1.4 inches. The thickness of the track 800 may range between approximately 0.1 inches in areas with lower load to approximately 0.3 inches in higher load areas. It will be recognized, however, that the dimensions of the track 800, as well as other components described herein, are directly dependent on the loads being reacted; a different application would require different sizing and thus different tracks. In certain embodiment, the surfaces of the track 800 that are contacted by the rollers (e.g., surface 806B and surface 810A) are coated to increase the hardness thereof. In certain embodiments, the coating may include nodular thin dense chrome or tungsten carbide. Additionally, tungsten carbide coating may be applied to locks and strikers described below to minimize wear thereof.

Upper flange 804 includes a plurality of attachment points 812 for enabling a top surface 806A of upper flange to be attached to a mounting structure of an aircraft, such as rotorcraft 100. The upper flange 804 is connected to the track spars with a series of fasteners along the length thereof as shown in FIG. 7A. The lower panel of the fuselage torque box and the outboard support panel (support panel 610, FIG. 6) are sandwiched between the tracks and the track spars as described above.

Figure 9:
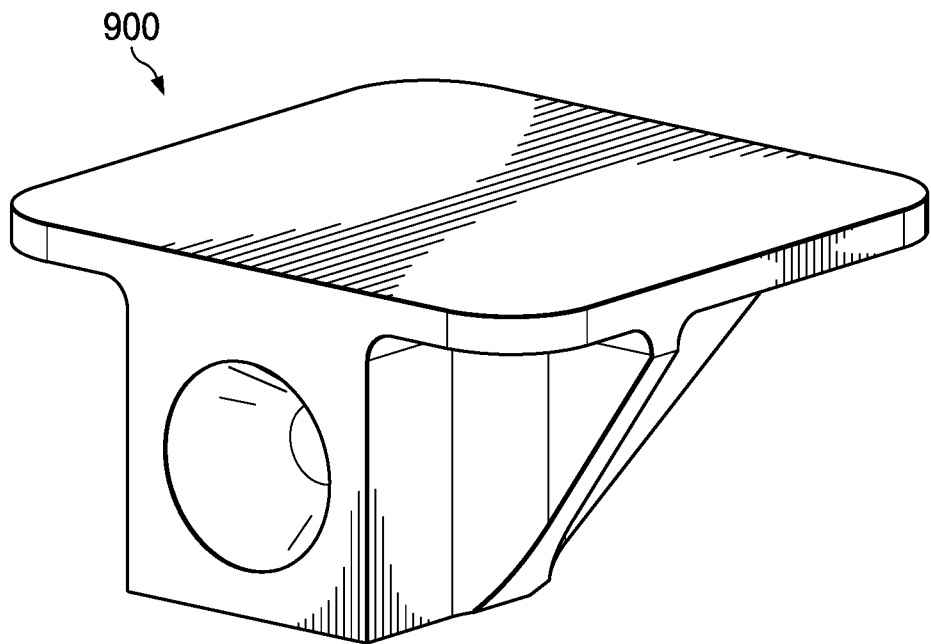
FIG. 9 is a perspective view of a forward lock, such as the forward locks shown in FIGS. 7A-7D.
Figure 10:
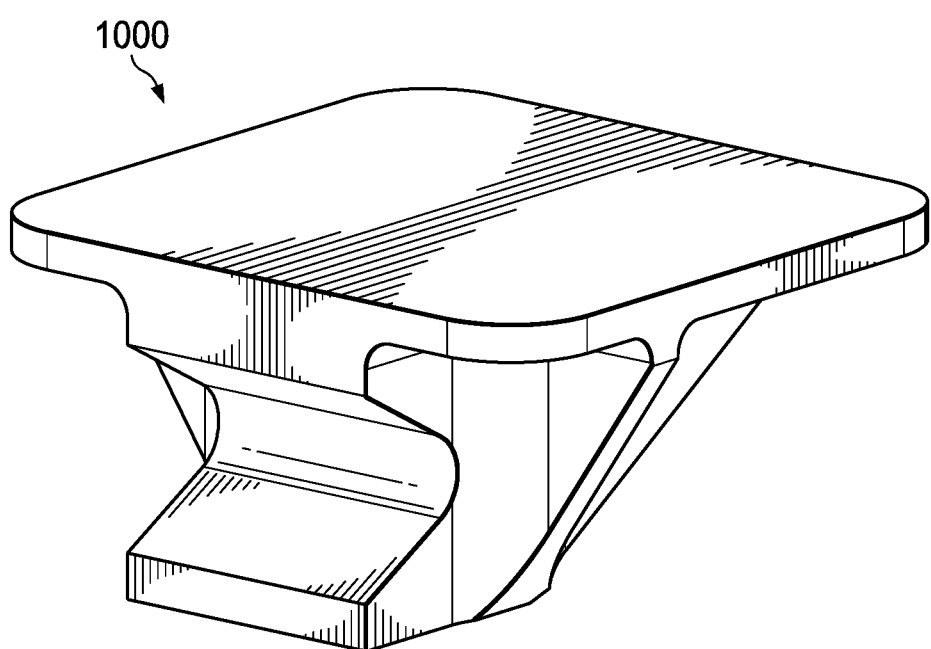
FIG. 10 is a perspective view of an aft lock, such as the aft locks shown in FIGS. 7A-7D.

FIG. 9 is a perspective view of a forward lock 900, such as inboard locks 702A, 704A, shown in the above-described drawings, in accordance with features of embodiments described herein. FIG. 10 is a perspective view of an aft lock 1000, which may be used to implement any of aft locks 702B, 704B, shown in the above-described drawings, in accordance with features of embodiments described herein.

Figure 11:
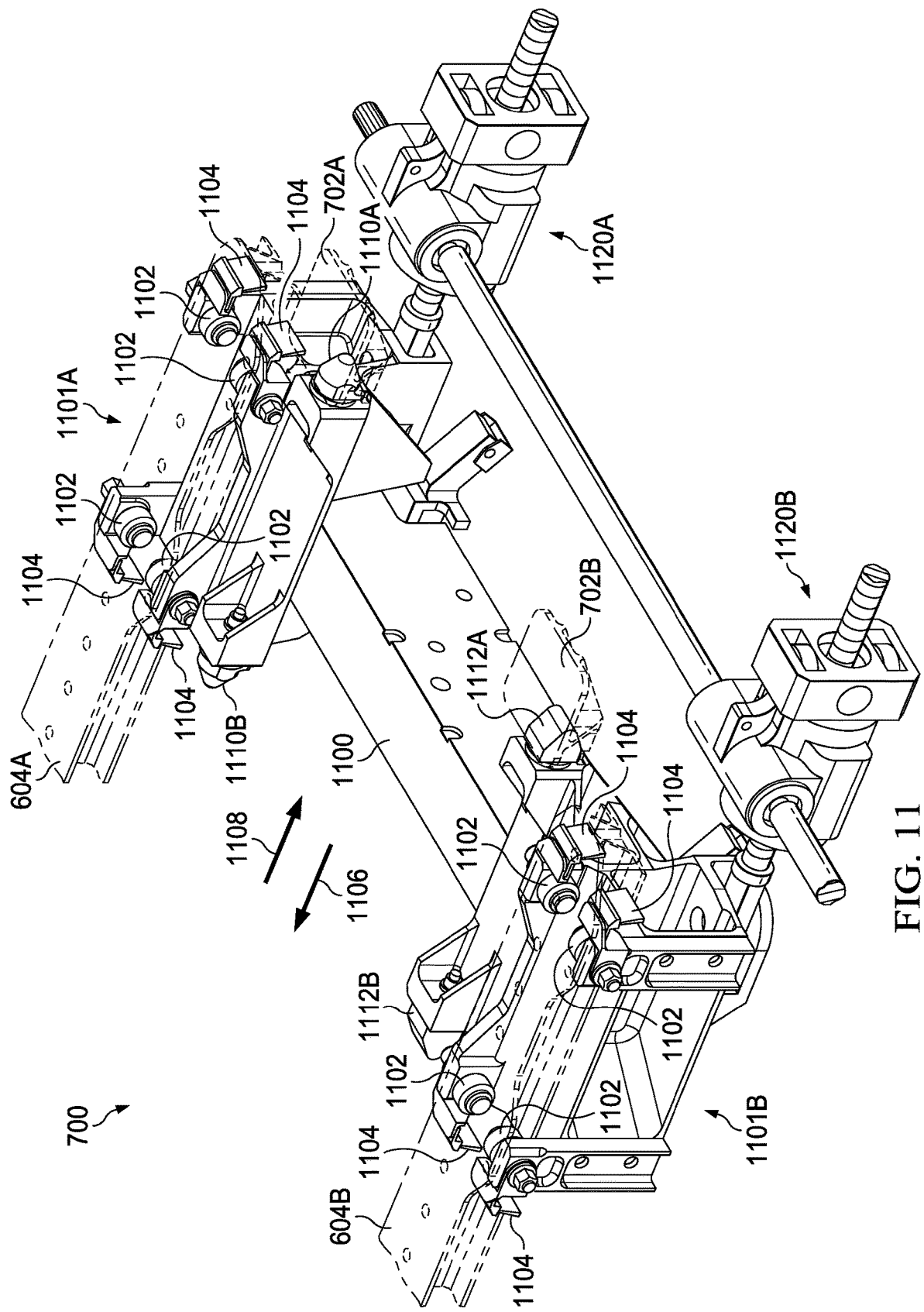
FIG. 11 illustrates an example embodiment of a mechanism for implementing internal payload extension and retraction.

FIG. 11 is a more detailed illustration of a portion of the payload extend/retract mechanism 700 of FIG. 7. As shown in FIG. 11, a BRU 1100 for carrying payload (not shown in FIG. 11 for purposes of clarity) is suspended from tracks 604A, 604B, via forward and aft suspension mechanisms 1101A, 1101B, each comprising a plurality of (e.g., four) track rollers 1102 for engaging the top surface of the lower flange of the respective track (two rollers on one side of the web and two on the opposite side of the web) and a plurality of (e.g., four) brush sweepers 1104 positioned so as to remove debris from the path of the carrier assembly whether the BRU 1100 is being moved in an outboard (payload extension) direction, as indicated by an arrow 1106, or an inboard (payload retraction) direction, as indicated by an arrow 1108, by actuator assemblies 1120A, 1120B. The primary function of the BRU 1100 is to serve as an intermediary between the carriage assemblies described herein and the munitions launcher (not shown in FIG. 11 for purposes of clarity) and to provide the ability to jettison the payload (e.g., weapons) in emergency situations.

In one embodiment, actuator assemblies may be advantageously implemented using linear ball screw actuator assemblies for translating rotational motion to linear motion using a threaded shaft that provides a helical raceway for ball bearings that act as a precision screw. In alternative embodiments, actuator assemblies may be implemented using a scissor lift-type of mechanism, a cable/pulley type of mechanism, and/or a ball and chain type of mechanism, for example. As used herein, "actuator" and/or "actuator assembly" refers to a component that is responsible for moving a mechanism or system, such as the payload door and/or BRU, for example, in response to a control signal from an actuator control system, which in the illustrated embodiments may be incorporated into the aircraft or may be provided from a remote system in communication with the aircraft. The actuator control signal may be an electrical signal, pneumatic pressure, and/or hydraulic pressure, for example. Upon receipt of an actuator control signal, the actuator responds by providing mechanical motion. Although particular types of actuators may be described for use herein, it will be recognized that any number of different types of actuators may be employed, including, but not limited to, hydraulic actuators, pneumatic actuators, electric actuators, coiled polymer actuators, thermal actuators, magnetic actuators, and/or mechanical actuators.

As previously noted, rollers 1102 engage and roll along the top surface of the lower flange of the track, with a pair of rollers disposed on opposite sides of the track web.

Forward carrier assembly 1101A includes an inboard forward striker 1110A, which makes contact and engages with the forward inboard lock 702A when the payload is fully retracted into the payload bay, and an outboard forward striker 1110B, which makes contact and engages with the forward outboard lock 704B (FIG. 7A) when the payload is fully extended from the payload bay as described herein. Similarly, aft carrier assembly 1101B includes an inboard aft striker 1112A, which makes contact with and engages the aft inboard lock 702B when the payload is fully retracted into the payload bay, and an outboard aft striker 1112B, which makes contact with and engages the aft outboard lock 704B (FIG. 7A) when the payload is fully extended from the payload bay as described herein.

In accordance with features of embodiments described herein, actuator assemblies pre-load the strikers against the locks with roughly 1000 pounds of force, for example, in order to minimize free-play and keep the strikers seated in the locks as the aircraft maneuvers.

Figure 12B:
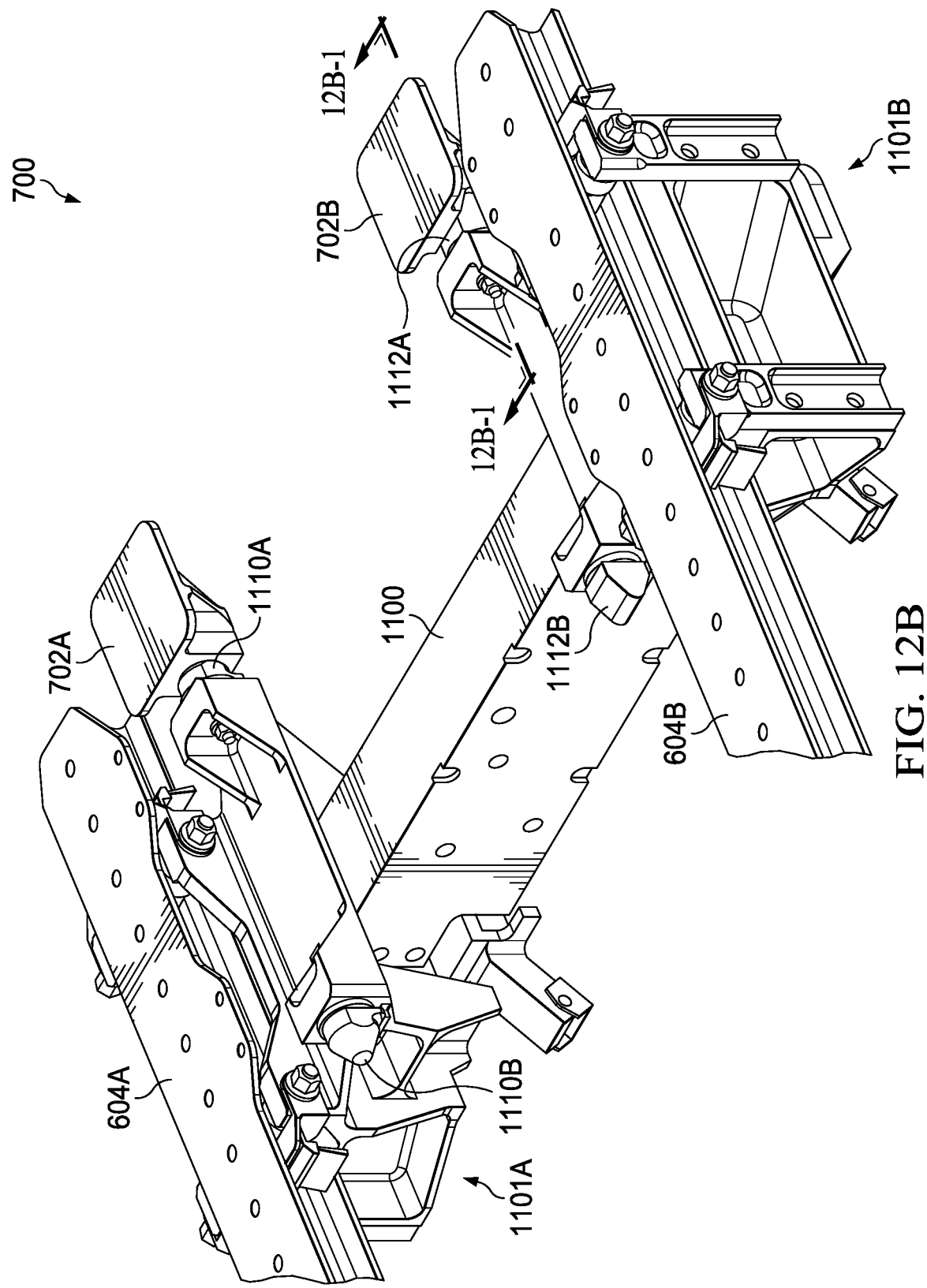

FIGS. 12A, 12A-1, 12B, and 12B-1 (hereinafter collectively referred to as "FIGS. 12") illustrate in greater detail engagement between forward strikers and locks and aft strikers and locks of the mechanism 700. As shown in FIG. 12, in an example embodiment, each forward striker, shown in FIG. 12 as forward striker 1110A, includes a conical protrusion 1202 that is configured to be received within a conical receptacle 1204 of a corresponding forward lock, shown in FIG. 12 as forward lock 702A, when the payload (not shown) is fully extended (i.e., forward outboard striker/lock) or fully retracted (i.e., forward inboard striker/lock). The conical protrusion and corresponding conical receptacle of the forward striker/lock combination operate to react X (fore-aft), Y (inboard-outboard) and Z (up-down) loads when the payload is fully extended (in which condition X, Y and Z loads are reacted by forward outboard striker/lock engagement) or fully retracted (in which condition X, Y and Z loads are reacted by forward inboard striker/lock engagement). In contrast, as shown in FIG. 12, in an example embodiment, each aft striker, shown in FIG. 12 as aft striker 1112A, includes a wedge-shaped protrusion 1212, which is received within a wedge-shaped receptacle 1214 of a corresponding aft lock, shown in FIG. 12 as aft lock 702B, when the payload (not shown) is fully extended (i.e., aft outboard striker/lock) or fully retracted (i.e., aft inboard striker/lock). The wedge-shaped protrusion and corresponding wedge-shaped receptacle of the aft striker/lock combination operate to react Y and Z loads when the payload is fully extended (in which condition Y and Z loads are reacted by aft outboard striker/lock engagement) or fully retracted (in which condition Y and Z loads are reacted by aft inboard striker/lock engagement). Because the shape of the aft locks and strikers are wedge shaped instead of conical, the aft striker can be misaligned in the X-direction to the aft locks when engaged. This ensures the mechanism will not bind in the X-direction. It will be recognized that different applications may require constraint of different loads or combinations of loads in the X, Y, and/or Z direction at each lock, in which case the shapes of the lock protrusions and corresponding lock receptacles may be different than as illustrated herein and will be designed such that they are capable of effectively reacting the required load(s).

Strikers and corresponding locks force the extend/retract mechanism 700 into a repeatable position, eliminate free-play in both the extended and retracted positions, and react crash loads in both positions.

Figure 13A:
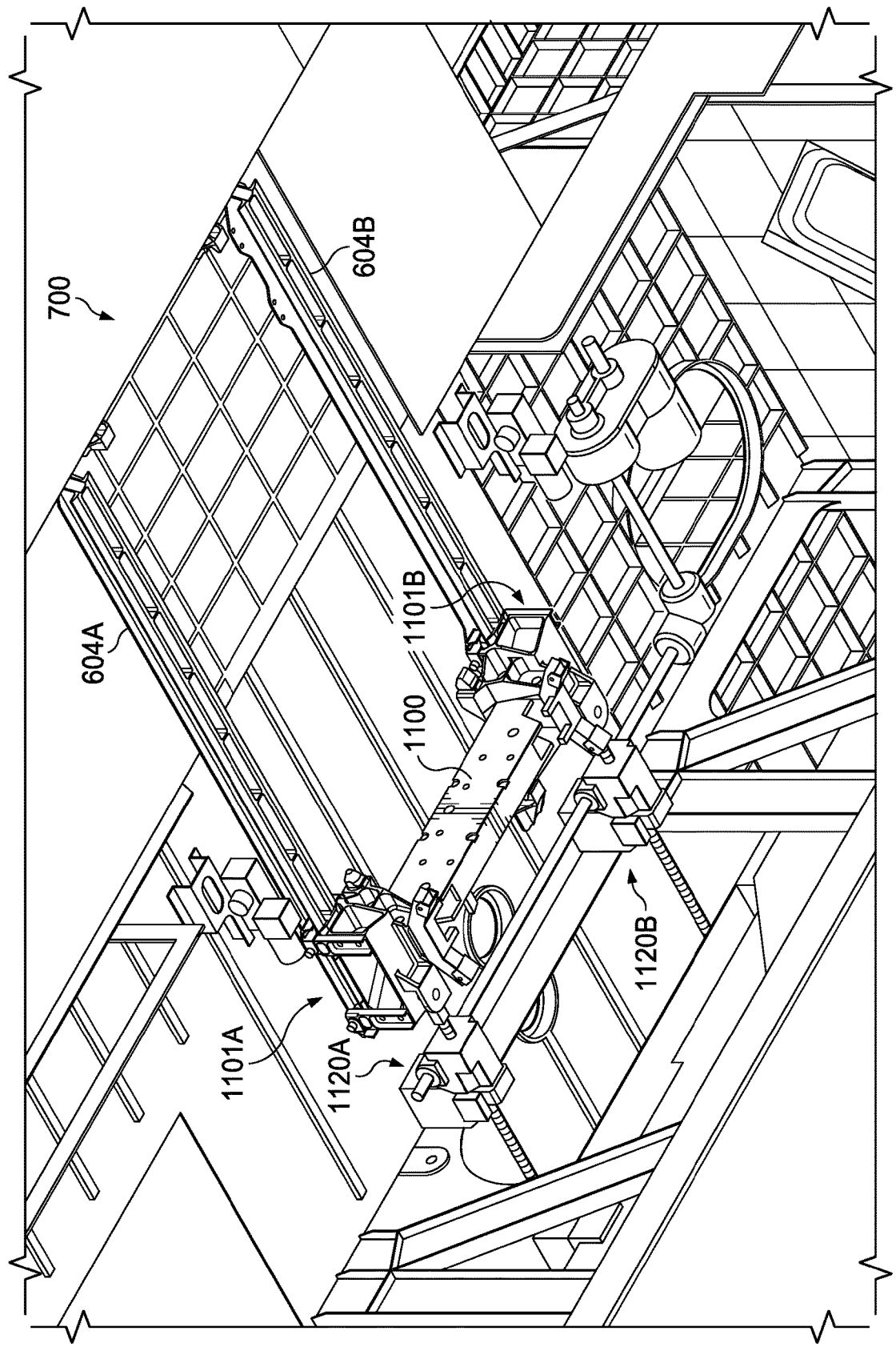
FIGS. 13A-13C illustrate an alternative view of the embodiment of a mechanism for implementing internal payload extension and retraction shown in FIG. 11.
Figure 13B:
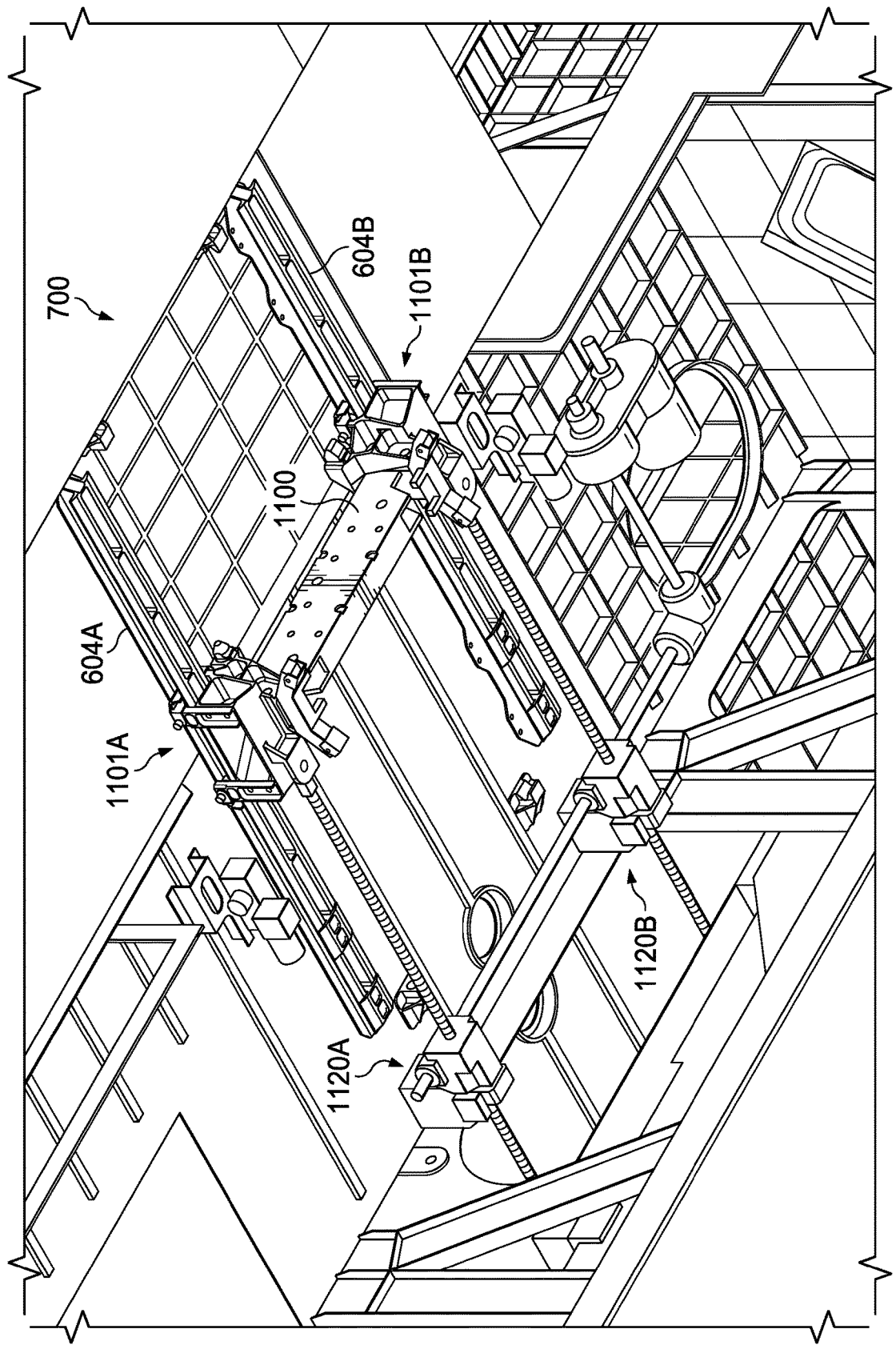
Figure 13C:
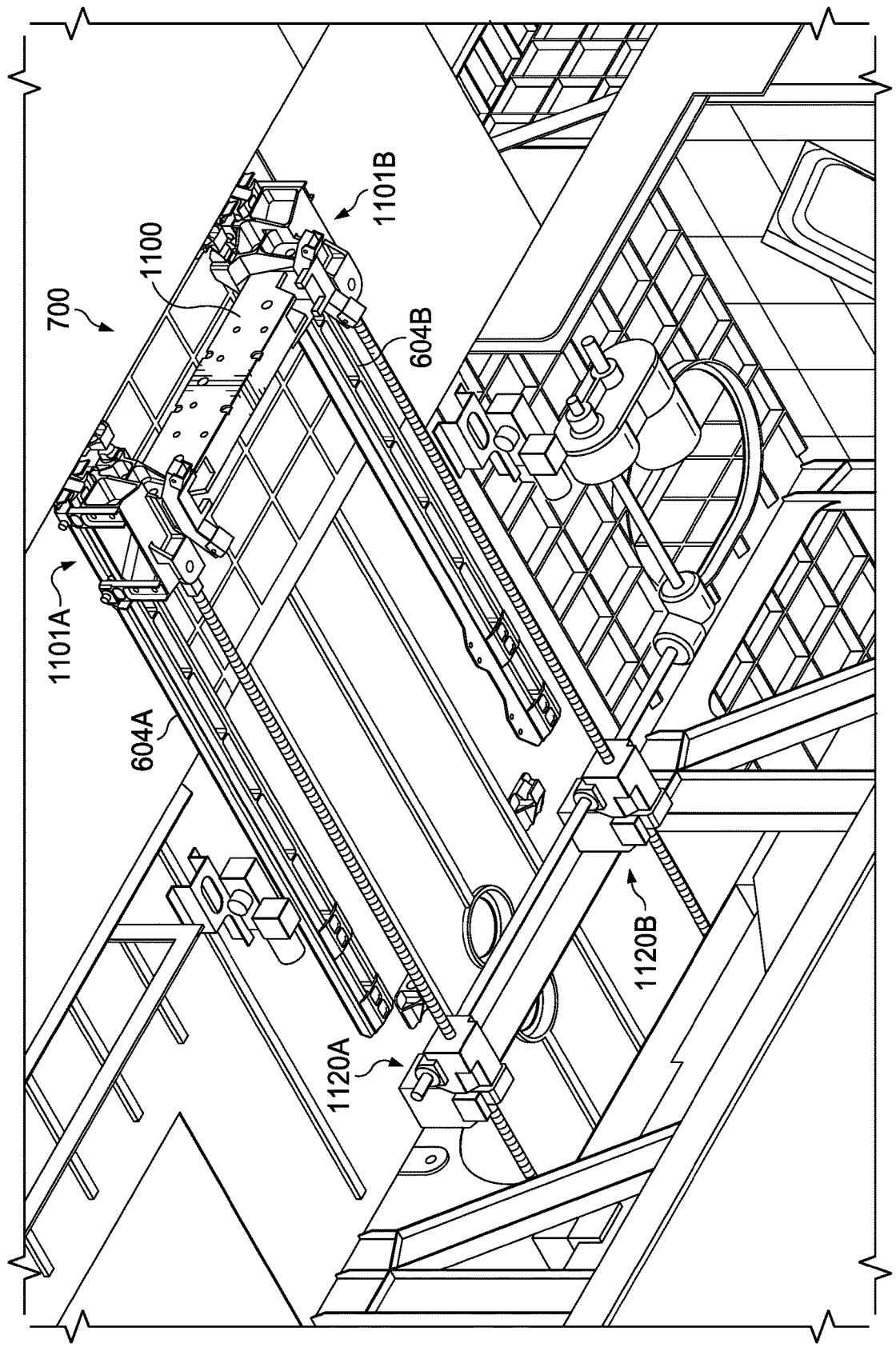

FIGS. 13A-13C illustrate operation of a payload extension/retraction mechanism 700 for implementing features of embodiments described herein. It will be recognized that the views shown in FIGS. 13A-13C are cutaway perspective views directed up from a bottom of a payload bay, with corresponding payload omitted from the view for the sake of clarity. FIG. 13A illustrates the payload (represented in FIGS. 13A-13C by BRU 1100) and carrier assemblies 1101A, 1101B, disposed by actuators 1120A, 1120B, on respective tracks 604A, 604B, in a fully retracted position, such that inboard strikers (not shown in FIG. 13A) fully engage inboard locks (not shown in FIG. 13A), in a manner such as illustrated in FIG. 12B. Referring to FIG. 13B, actuators 1120A, 1120B, have moved the payload/BRU 1100 and carrier assemblies 1101A, 1101B, along respective tracks 604A, 604B, to a partially extended position. In this position, the rollers are supporting the payload in all directions except inboard-outboard, which loads are being reacted by the actuator assemblies.

Referring finally to FIG. 13C, actuators 1120A, 1120B, have moved the payload/BRU 1100 and carrier assemblies 1101A, 1101B, to a fully extended position, in which outboard strikers (not shown in FIG. 13C) fully engage outboard locks (not shown in FIG. 13C), in a manner such as illustrated in FIG. 12B.

Figure 14A:
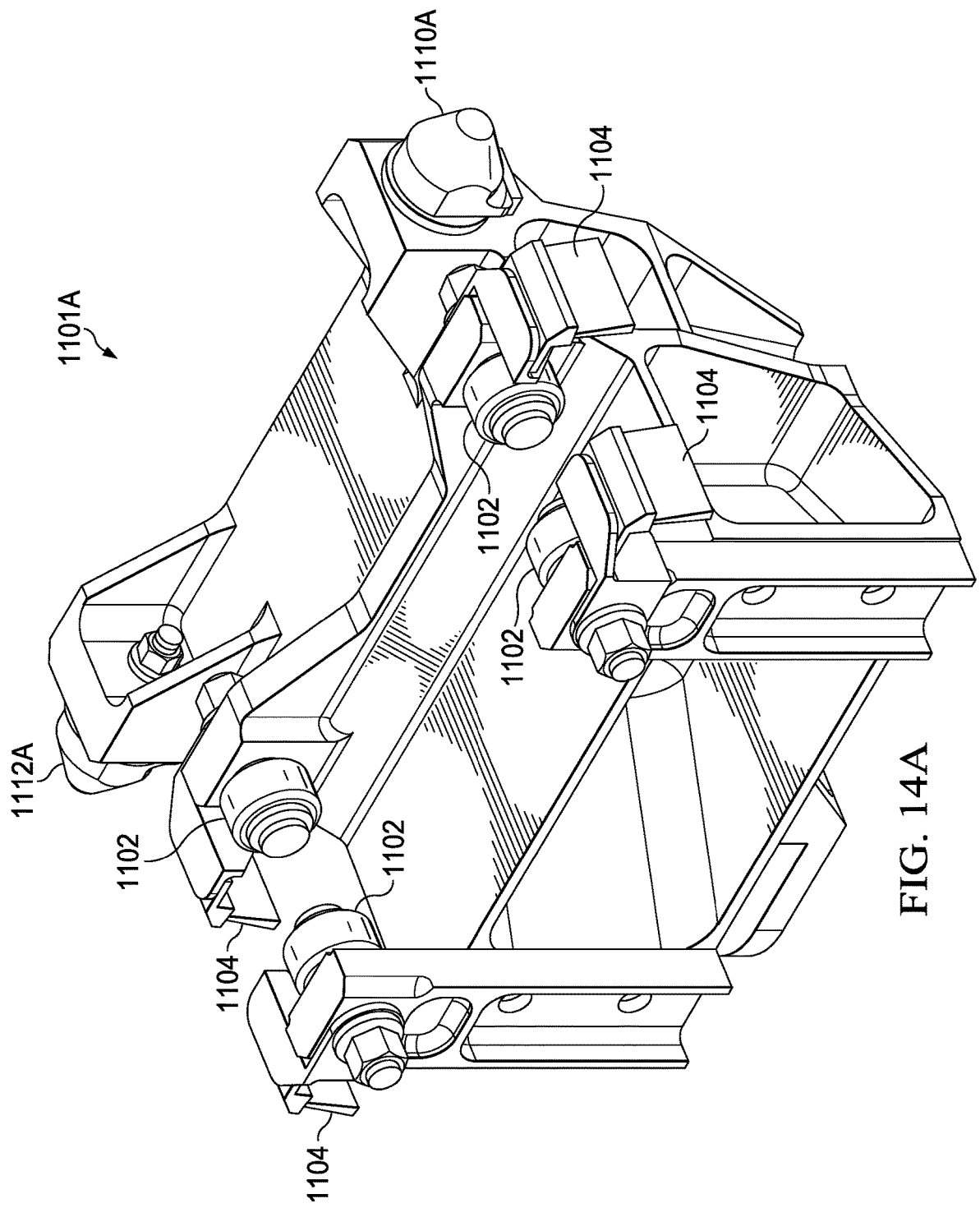
FIGS. 14A-14D illustrate a carrier assembly in connection with the embodiment of a mechanism for implementing internal payload extension and retraction shown in FIG. 11.
Figure 14B:
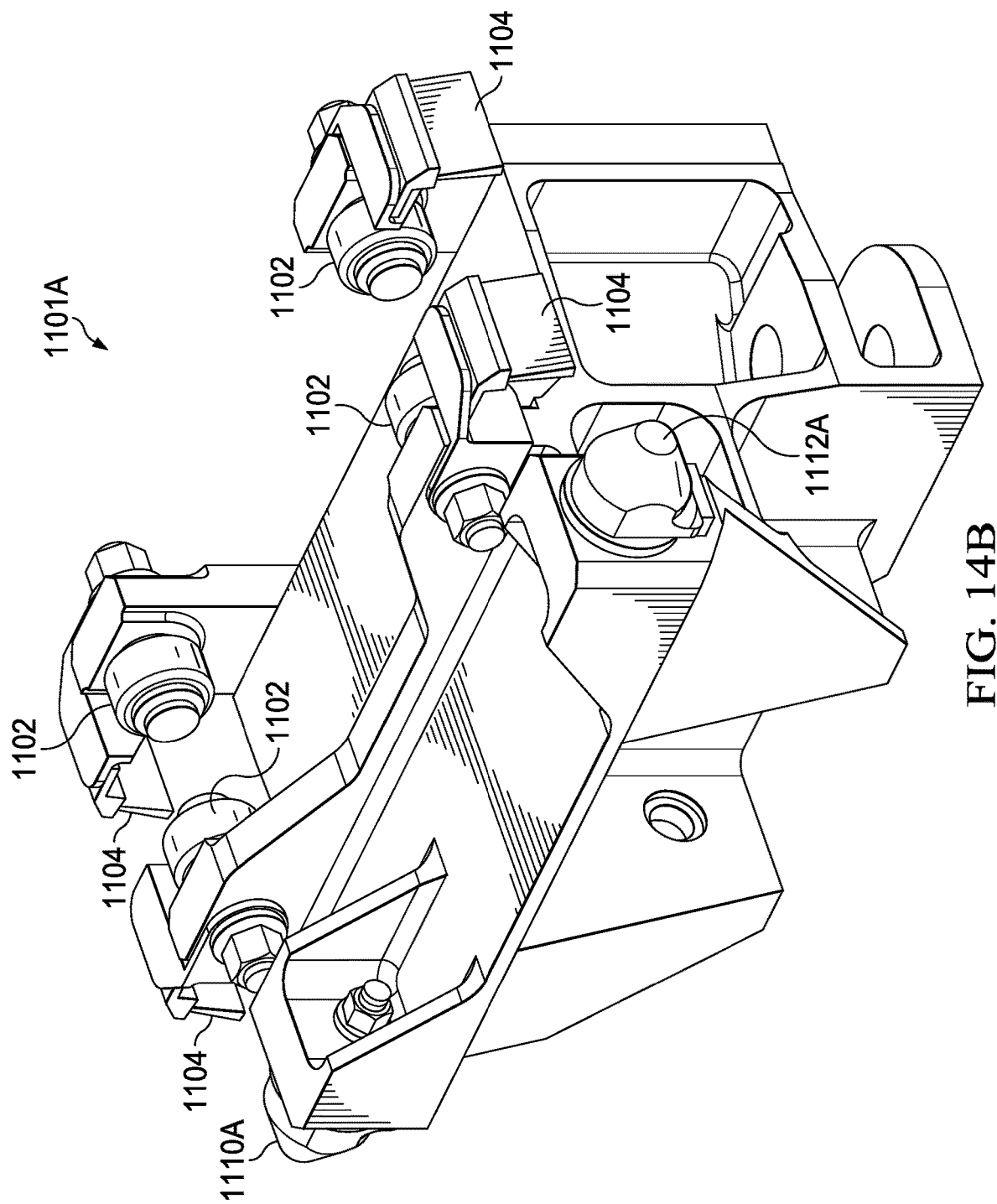
Figure 14C:
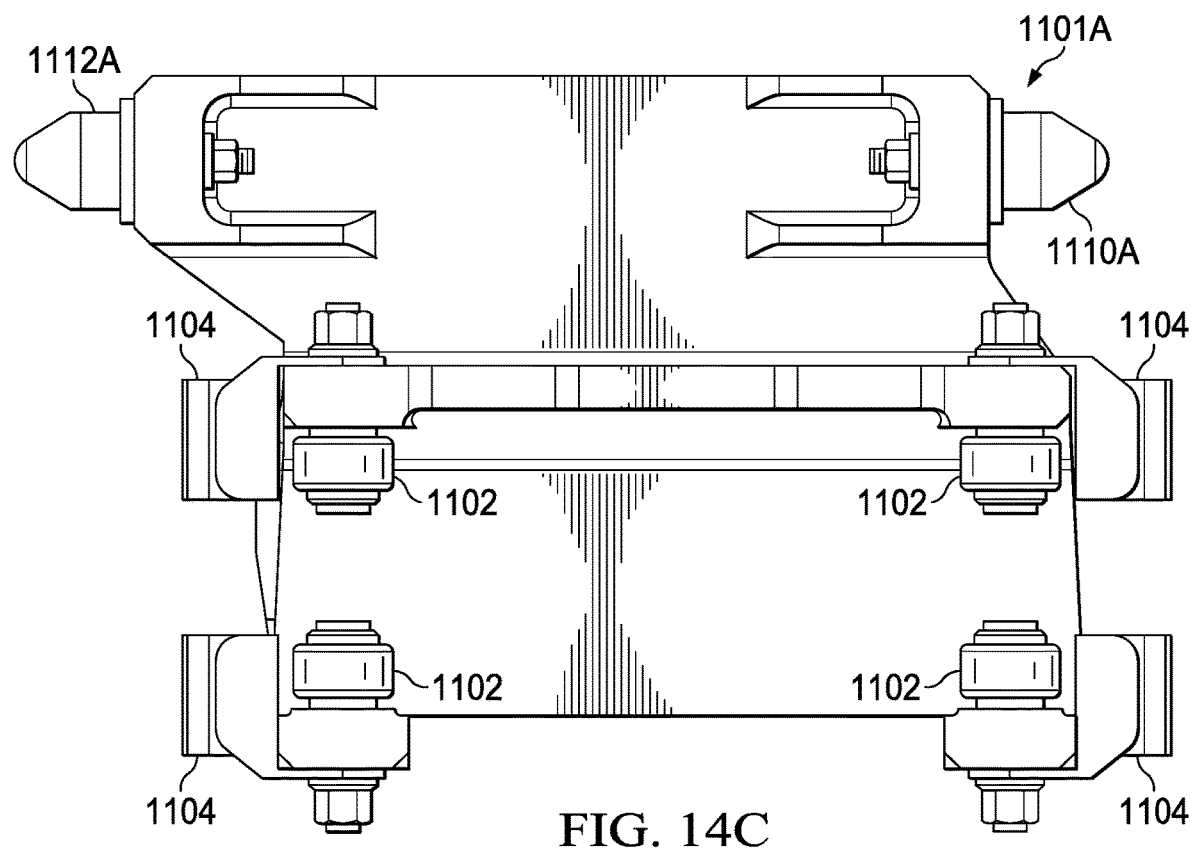
Figure 14D:
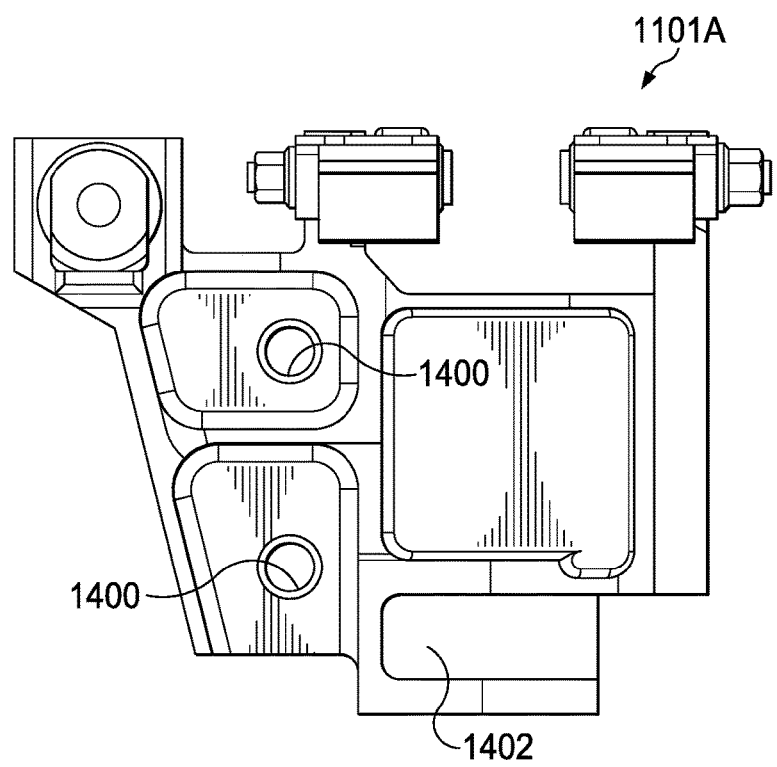

FIGS. 14A-14D illustrate various views of forward carrier assembly 1101A in accordance with embodiments described herein. In particular, FIGS. 14A and 14B illustrate perspective views of opposite sides of forward carrier assembly 1101A, with FIG. 14A illustrating an inboard side of the assembly 1101A and FIG. 14B illustrating an outboard side of the assembly 1101A. FIG. 14C is a top plan view of forward carrier assembly 1101A wherein a left side of the view is an inboard side of the assembly 1101A and a right side of the view is an outboard side of the assembly 1101A. FIG. 14D is a plan view of an inboard end of forward carrier assembly 1101A. As shown in FIG. 14D, forward carrier assembly 1101A includes BRU attachment point 1400 and an actuator attachment point 1402. In certain embodiments, two bolts are provided between the BRU and each carrier. The BRU attaches in double shear at each of these bolts via a flange of the carrier on either side of the BRU. It will be recognized that, while FIGS. 14A-14D illustrate forward carrier assembly 1101A, configuration of aft carrier assembly 1101B is similar or identical in configuration to forward carrier assembly 1101A except that the shape of the aft strikers is different, as described in detail above.

Figure 15A:
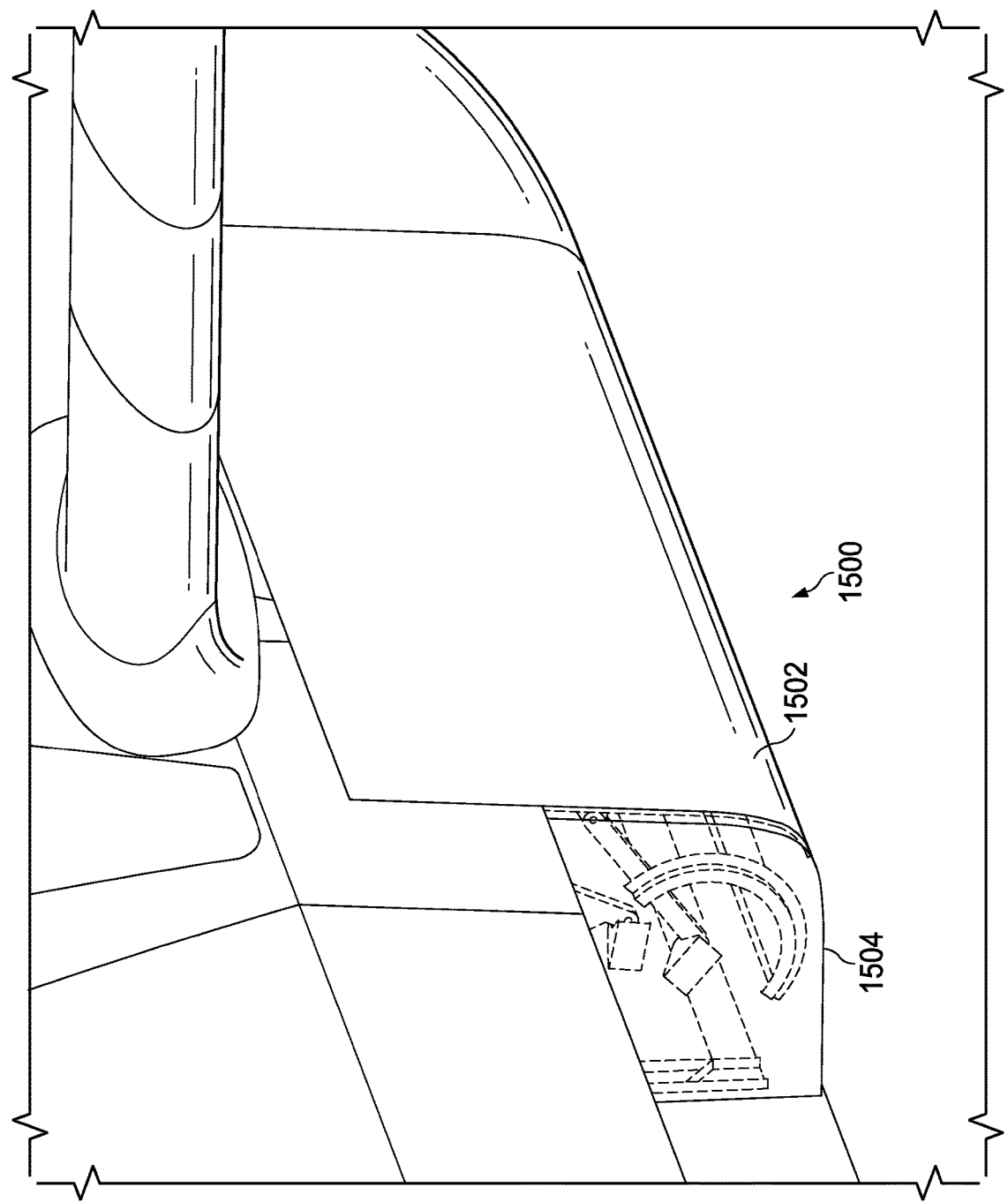
FIGS. 15A-15C, FIG. 16, and FIGS. 17A-17B illustrate a four bar payload door mechanism for use in connection with a mechanism for implementing internal payload extension and retraction in accordance with embodiments described herein.
Figure 15B:
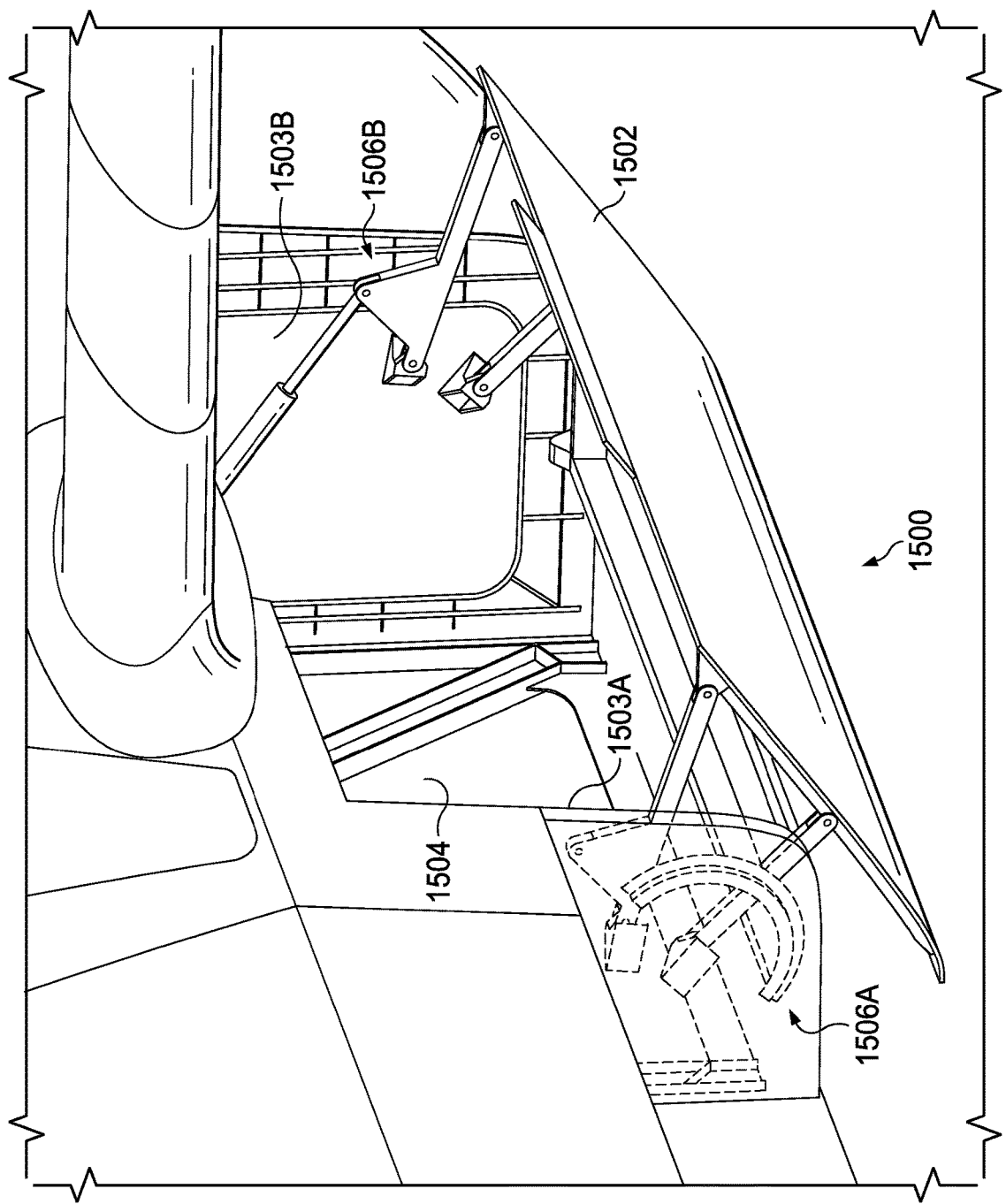
Figure 15C:
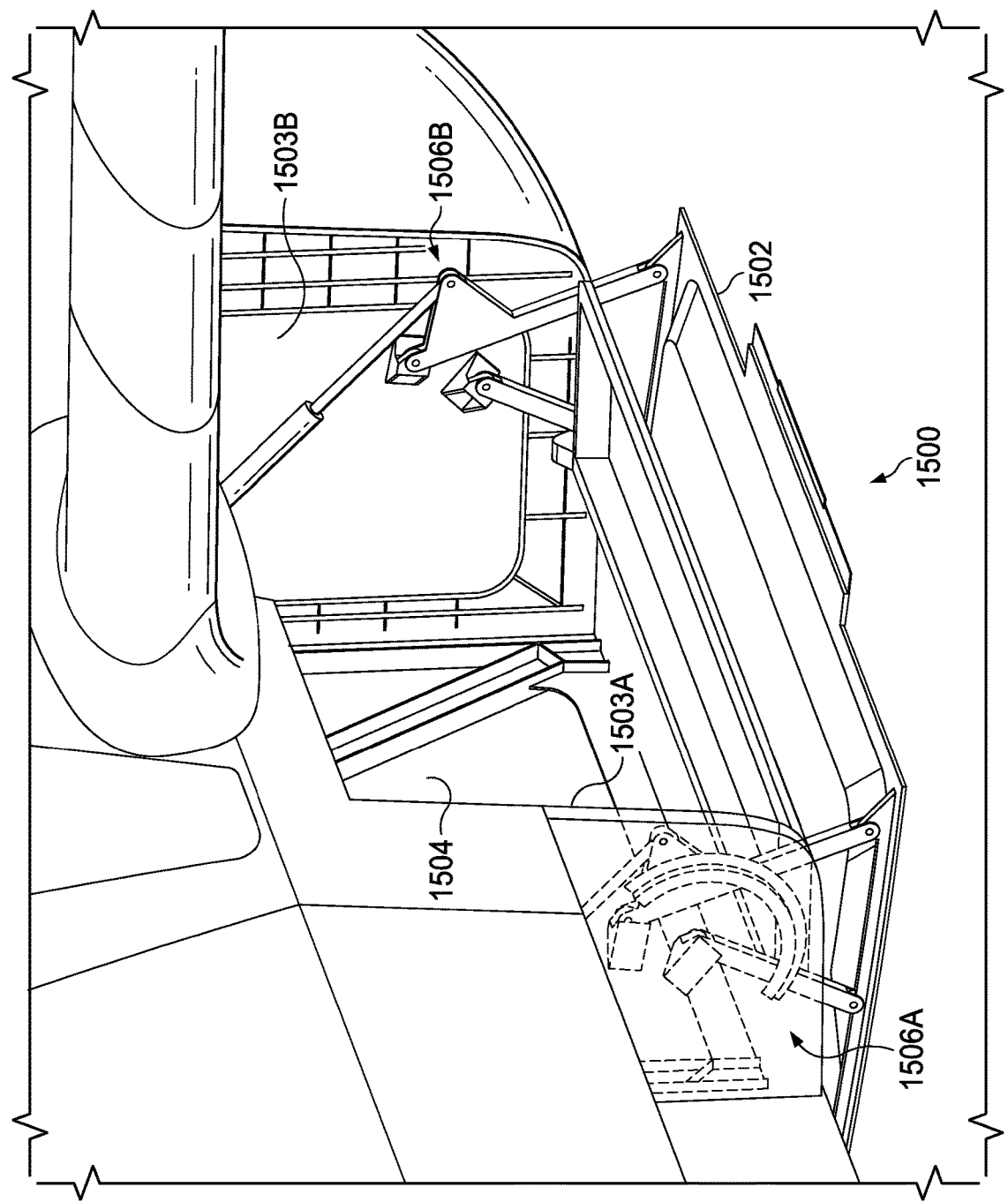

FIGS. 15A-15C illustrate a payload door mechanism for implementation in connection with the embodiments of a payload extension and retraction system described herein. In particular, FIGS. 15A-15C illustrate a four-bar payload door mechanism 1500. The four-bar payload door mechanism 1500 includes a single door panel 1502 connected to forward and aft walls 1503A, 1503B of payload bay 1504 via actuator mechanisms 1506A, 1506B (illustrated in greater detail with reference to FIGS. 16, 17A, and 17B). FIG. 15A illustrates the payload bay door panel 1502 in a closed position. FIG. 15B illustrates the payload bay door panel 1502 in a half open position. Finally, FIG. 15C illustrates the payload bay door panel 1502 in a completely open position. In certain embodiments, slots in the belly skin of the aircraft (e.g., rotorcraft 100) are provided for receiving the lower link of the actuator mechanism and are provided with brush seals to guard against debris. In particular, based on the kinematics, the links sweep through a portion of the belly skin below the door, creating inboard/outboard slots in the skin to provide clearance for the links. Brush seals are used to close off that opening as much as possible when the door is closed.

Figure 16:
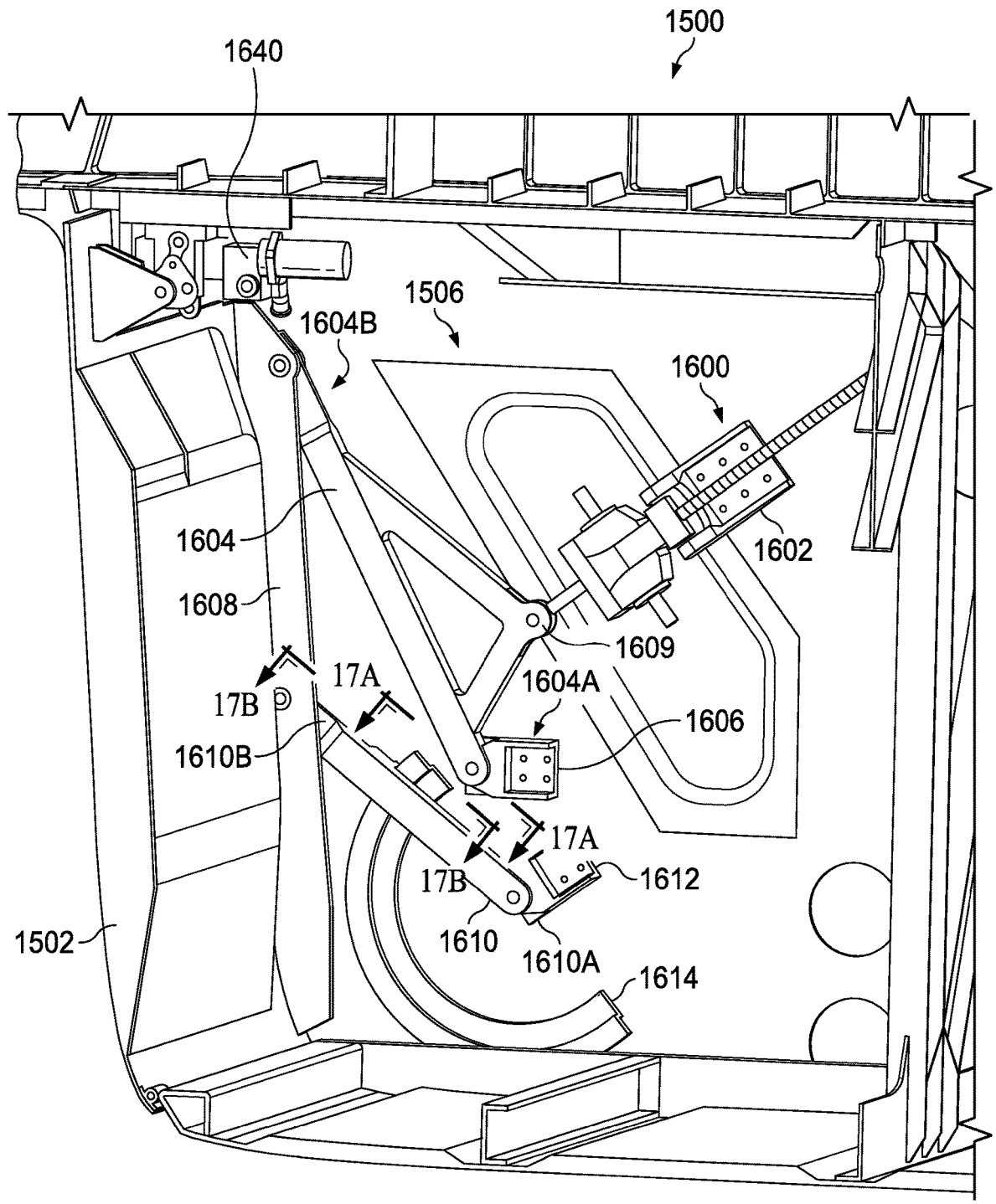
Figure 17A:
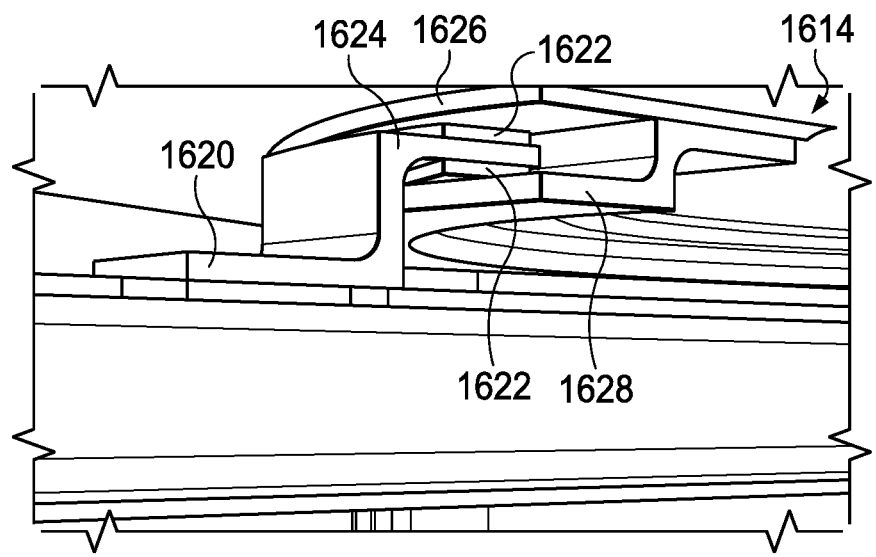
Figure 17B:
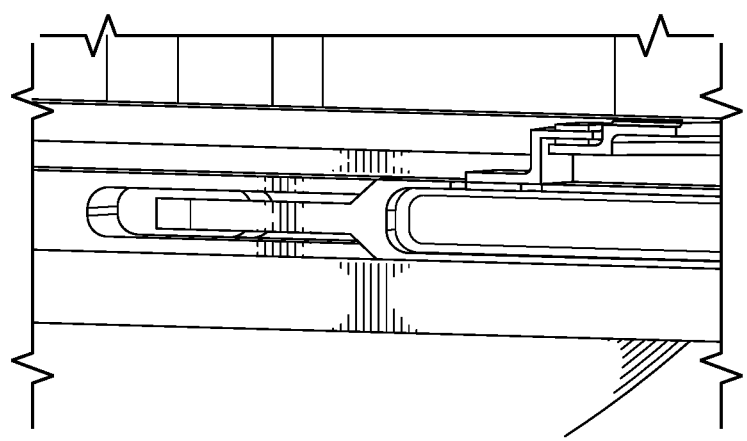

FIGS. 16, 17A, and 17B illustrate a forward actuator mechanism 1506A of the four-bar payload door mechanism 1500 in greater detail. Referring to FIG. 16, an actuator assembly 1600, which may be implemented as a ball screw actuator, is mounted to the side wall of the payload bay via an actuator mount 1602. A first end of an upper link 1604, designated by a reference numeral 1604A, is rotatably connected to a link mount 1606 provided on the side wall of the payload bay. A second end of the upper link 1604 opposite the first end 1604A, designated by a reference numeral 1604B, is rotatably connected to an attachment fitting 1608 of the payload bay door panel 1502. Upper link 1604 is connected to actuator assembly 1600 at a point 1609 such that linear movement of the actuator assembly causes the upper link to move the door panel between open and closed positions depending on the position of the actuator assembly.

Similarly, a first end of a lower link 1610, designated by a reference numeral 1610A, is rotatably connected to a link mount 1612 provided on the side wall of the payload bay. A second end of the lower link 1610 opposite the first end 1610A, designated by a reference numeral 1610B, is rotatably attached to the attachment fitting 1608. A curved track 1614 is provided in the sidewall for engaging the lower link 1610 to provide fore-aft load restraint for the door. In particular, as better shown in FIG. 16B, the lower link 1610 includes a zee bracket 1620 having a wear pads 1622 bonded to top and bottom surfaces of an upper flange 1624 thereof, which flange 1624 is received between an upper flange 1626 and a lower flange 1628 comprising the track 1614 and moves along the track as the door panel 1502 opens as shown in FIGS. 15A-15C.

As best shown in FIG. 16, uplocks, represented by an uplock 1640, are also provided maintaining the door 1502 in a closed position when the payload is retracted. It should be noted that although not shown, in certain embodiments, each door (represented by door 1502) includes two uplocks per door; one forward (as shown in FIG. 16) and one aft (not shown in FIG. 16).

Figure 18A:
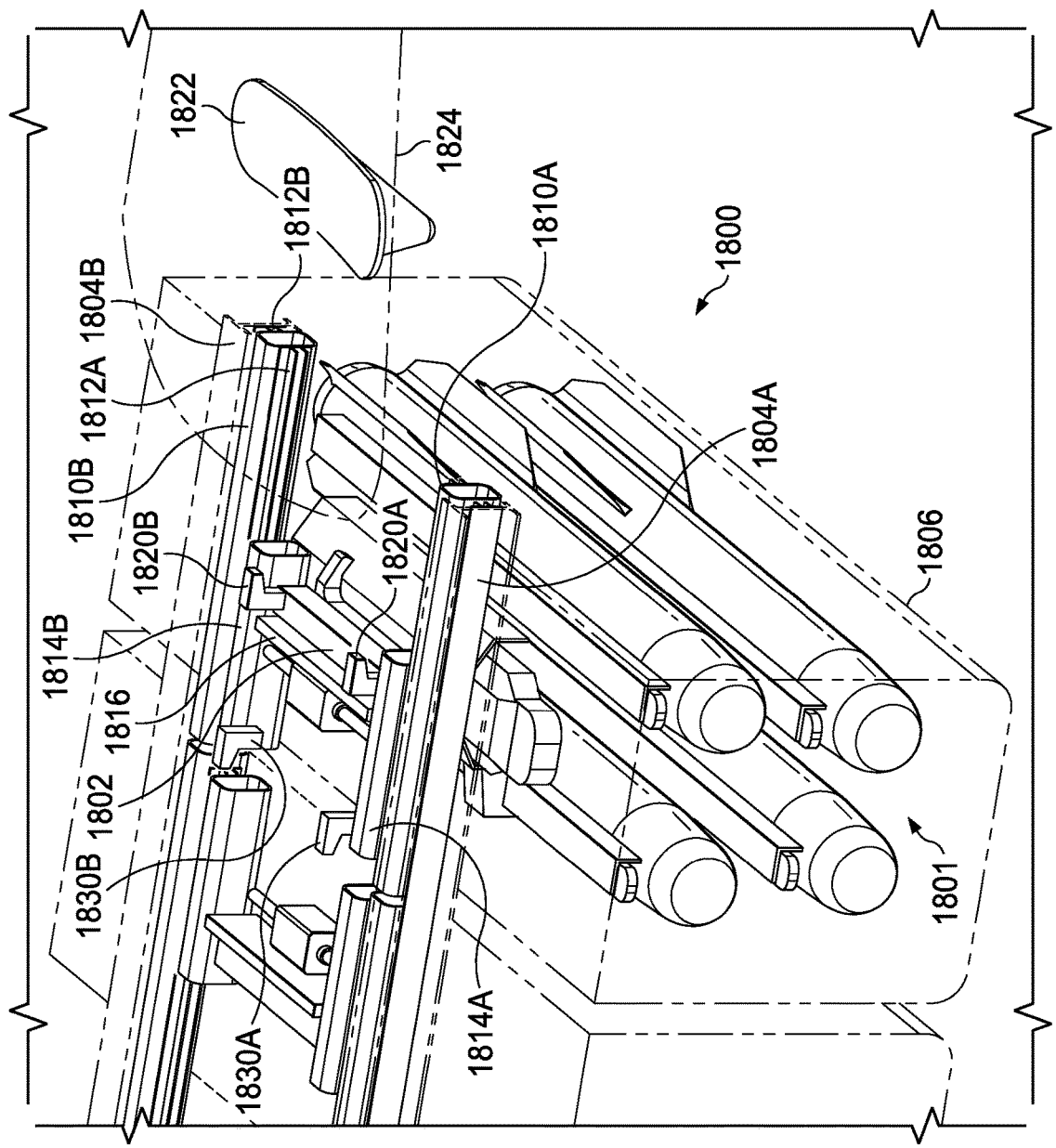
FIGS. 18A-18C illustrate a telescoping mechanism for use in implementing an internal payload extension and retraction mechanism in accordance with embodiments described herein.
Figure 18B:
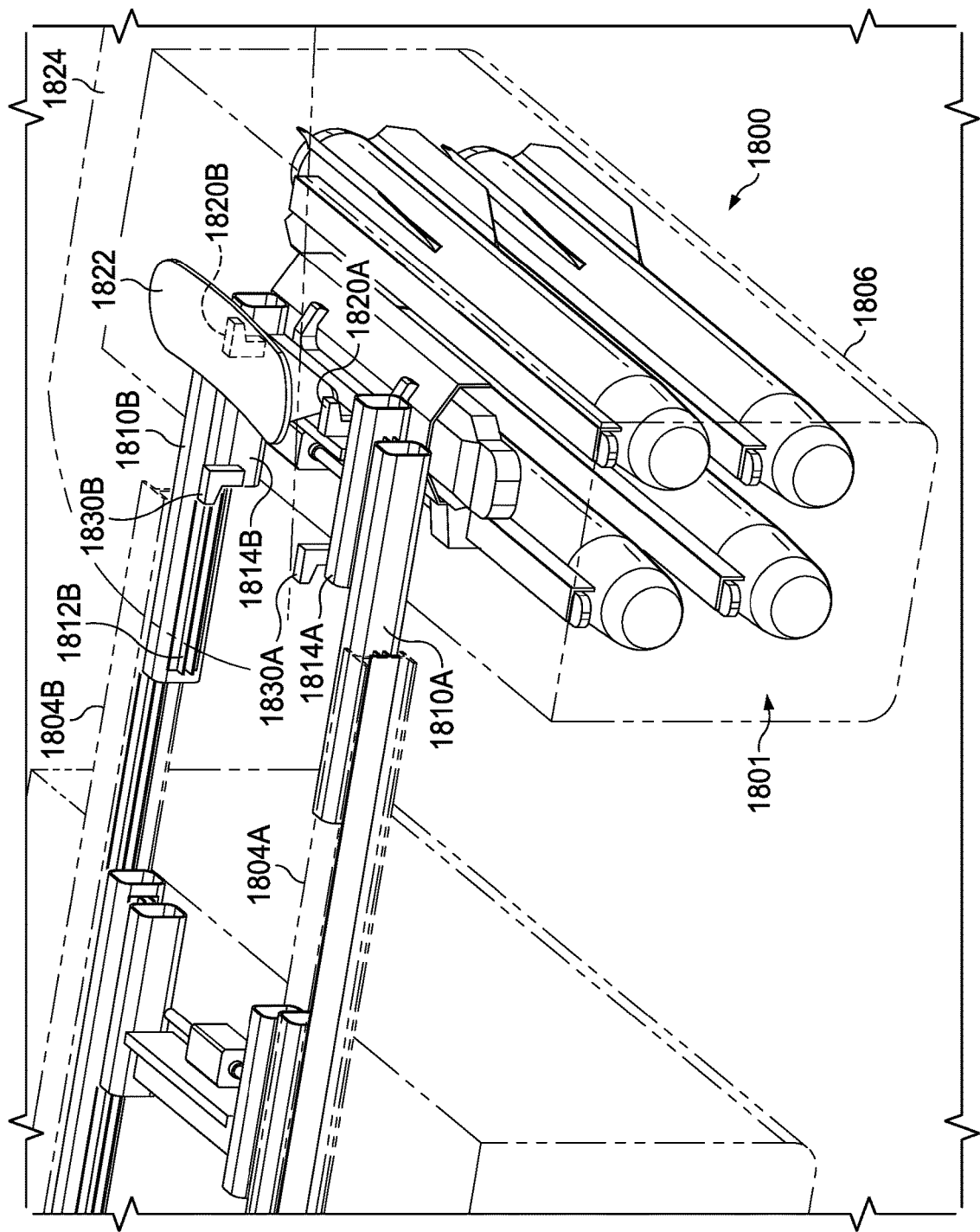
Figure 18C:
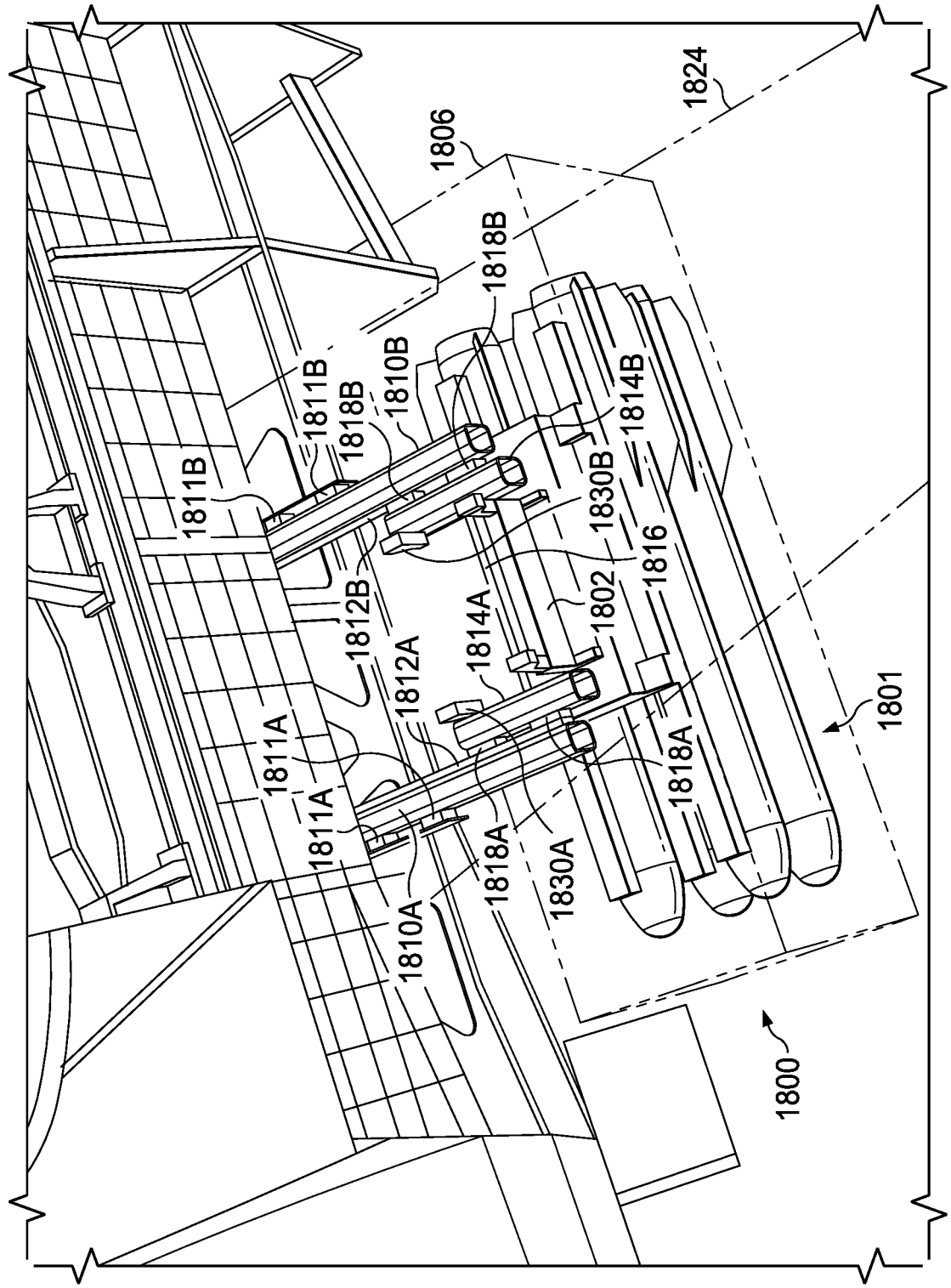

FIGS. 18A-18C illustrate an alternative embodiment of a payload extension and retraction system comprising a telescoping mechanism 1800. FIG. 18A shows payload 1801 retracted, or stowed, while FIGS. 18B and 18C shows the payload extended. As shown in FIGS. 18A-18C, the mechanism 1800 includes a BRU mount beam 1802, a forward load intro I-beam, or track, 1804A, and an aft load intro I-beam, or track, 1804B. Tracks 1804A, 1804B, are mounted to the fuselage (not shown in FIGS. 18A-18C) above the payload bay 1806. The mechanism 1800 further includes a first stage comprising a forward tube 1810A and an aft tube 1810B each including a set of sliders or rollers 1811A, 1811B (FIG. 18C) on an outer side thereof that engages the respective track 1804A, 1804B, and a track 1812A, 1812B, mounted on an inner side thereof. The mechanism 1800 further includes a second stage including a forward tube 1814A and an aft tube 1814B interconnected by a beam 1816. Each of the tubes 1814A, 1814B, includes a set of sliders or rollers 1818A, 1818B, on an outer side thereof for engaging the respective track 1812A, 1812B, of the respective first stage tube 1810A, 1810B.

As best shown in FIG. 18B, strikers 1820A, 1820B, are mounted to respective second stage tubes 1814A, 1814B, proximate the distal ends thereof for engaging with locks disposed in a fairing structure 1822 mounted to or incorporated in the bottom of the aircraft wing 1824. It will be recognized that strikers 1820A, 1820B, and corresponding locks may be configured in a manner similar to that described above with reference to FIGS. 12A-1 and 12B-2 inter alia. It will be noted that the locks must extend far enough below the wing to ensure that the strikers 1820A, 1820B, do not drag the bottom surface of the wing as the mechanism extends.

In summary, the mechanism 1800 functions as a telescoping slide, with the structure used to extend/retract the payload cantilevered off the fuselage below the wing. The payload remains connected to the fuselage alone until the mechanism engages at the outboard locks extending down from the bottom surface of the wing. As illustrated and described above with reference to FIGS. 18A-18C, there are two stages of structure that support the payload. The first stage is a set of tubes (one forward and one aft of the BRU) that include a set of rollers that roll along the tracks mounted to the fuselage (one forward and one aft of the BRU). The second stage is a set of tubes forward and aft of the BRU connected to one another via a beam. Rollers on each of the second stage tubes engage and roll along tracks mounted on the first stage tubes. The first stage moves relative to the fuselage, with the first stage tubes moving along the track until fully extended. The second stage moves relative to the first stage, with the second stage tubes moving along the tracks disposed on the first stage tubes until fully extended. In certain embodiments, this enables an overall payload extension length of 32 inches (i.e., when the first and second stages are both fully extended), with the first and second stage structure packages in the fuselage with reasonable distances between the rollers to handle the loads. The first stage structure also hangs on to the BRU, the strikers, and the actuators.

It should be noted that forward and aft inboard locks and strikers 1830A, 1830B, similar/identical to forward and aft outboard locks and strikers may also be provided in the embodiment illustrated in FIGS. 18A-18C (in a manner such as illustrated above in FIGS. 12A-1 and 12B-1).

Figure 19A:
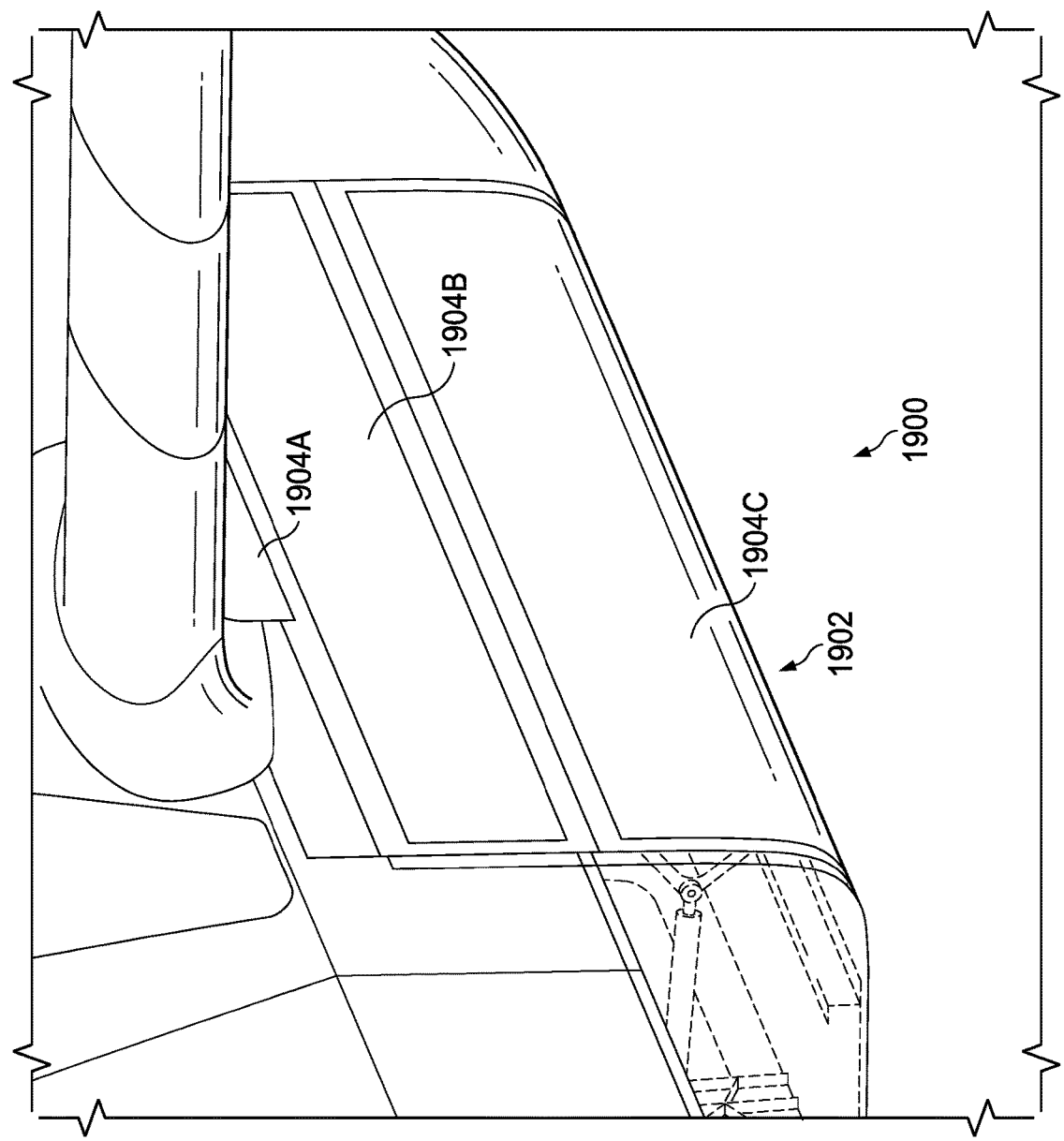
FIGS. 19A-19C illustrate a tri-fold payload door mechanism for use in connection with a mechanism for implementing internal payload extension and retraction in accordance with embodiments described herein.
Figure 19B:
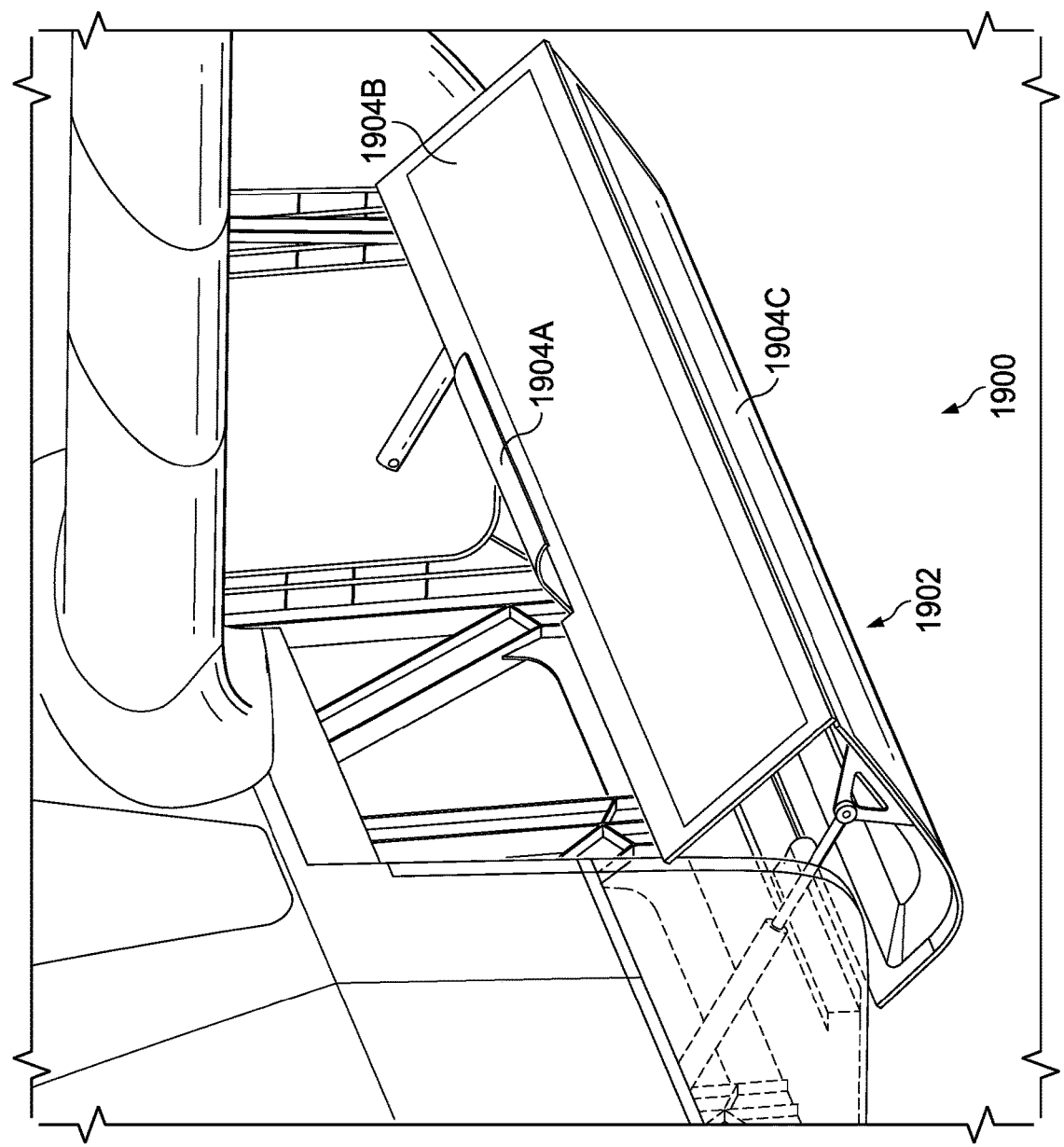
Figure 19C:
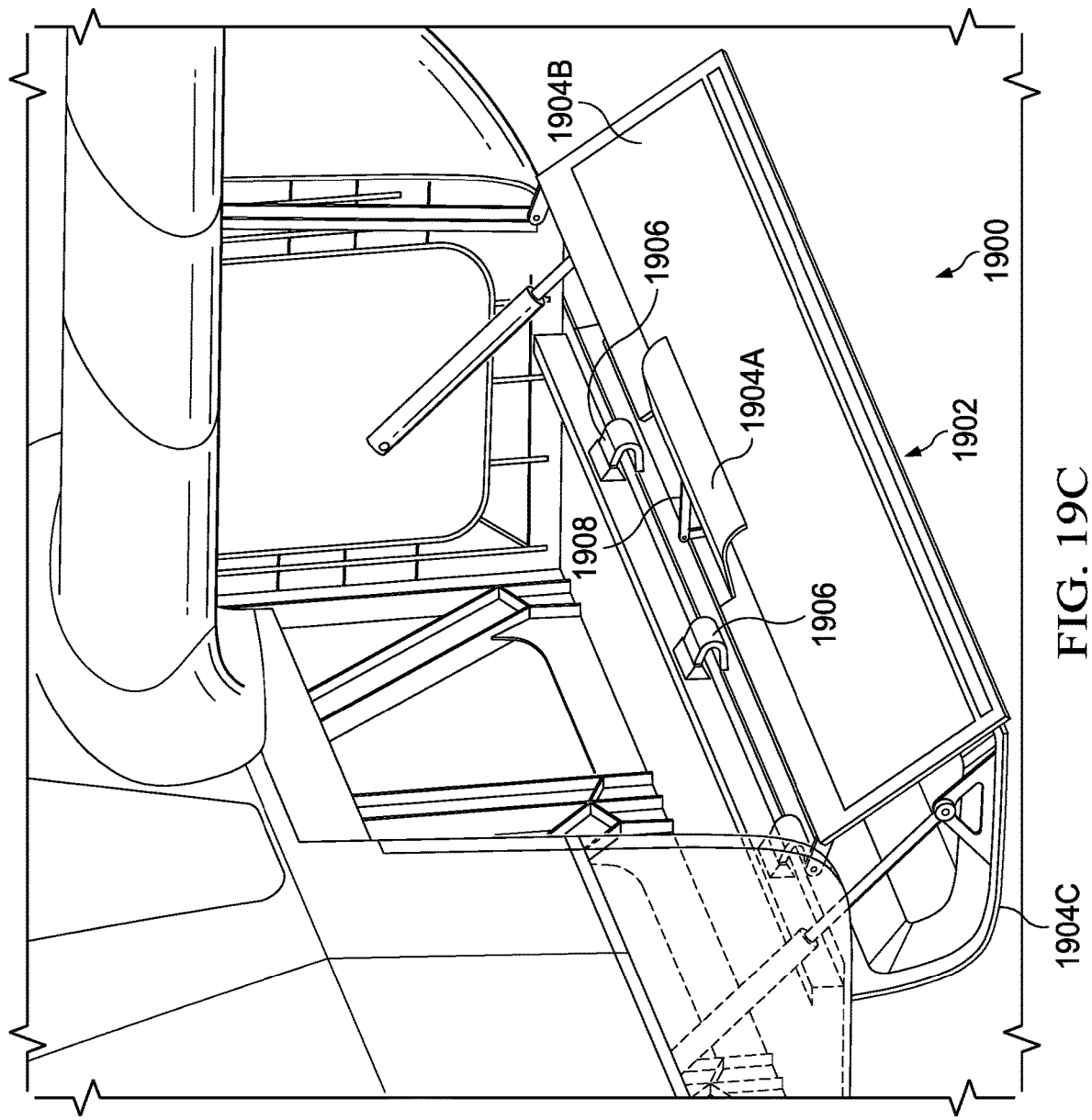

FIGS. 19A-19C illustrate an alternative door design for implementation in connection with the embodiments of a payload extension and retraction system described herein. In particular, FIGS. 19A-19C illustrate a trifold door design 1900. As shown in FIGS. 19A-19C, the door design 1900 includes a door 1902 comprising three panels 1904A, 1904B, and 1904C connected to one another and to fixed belly skin via piano hinges. The upper edge of the door 1900 is guided by rollers in tracks and door actuation occurs via a linear actuator as shown or via a cable, chain drive, and/or rack and pinion at the upper rollers. In certain embodiments, gooseneck hinges 1906 may be provided along a bottom edge and the upper panel may be slaved to the middle panel with a rod 1908. Gooseneck hinges 1906 enable the hinge point to be inboard of the edge of the door, with the gooseneck hinges providing clearance for the hinge to the fixed panel as the door opens up. Changing the hinge point modifies the open position of the door, which may be necessary in certain applications to provide additional clearance to payload or ground. FIG. 19A illustrates the door 1902 completely closed. FIG. 19B illustrates the door 1902 halfway open. FIG. 19C illustrates the door 1902 completely open.

Figure 20A:
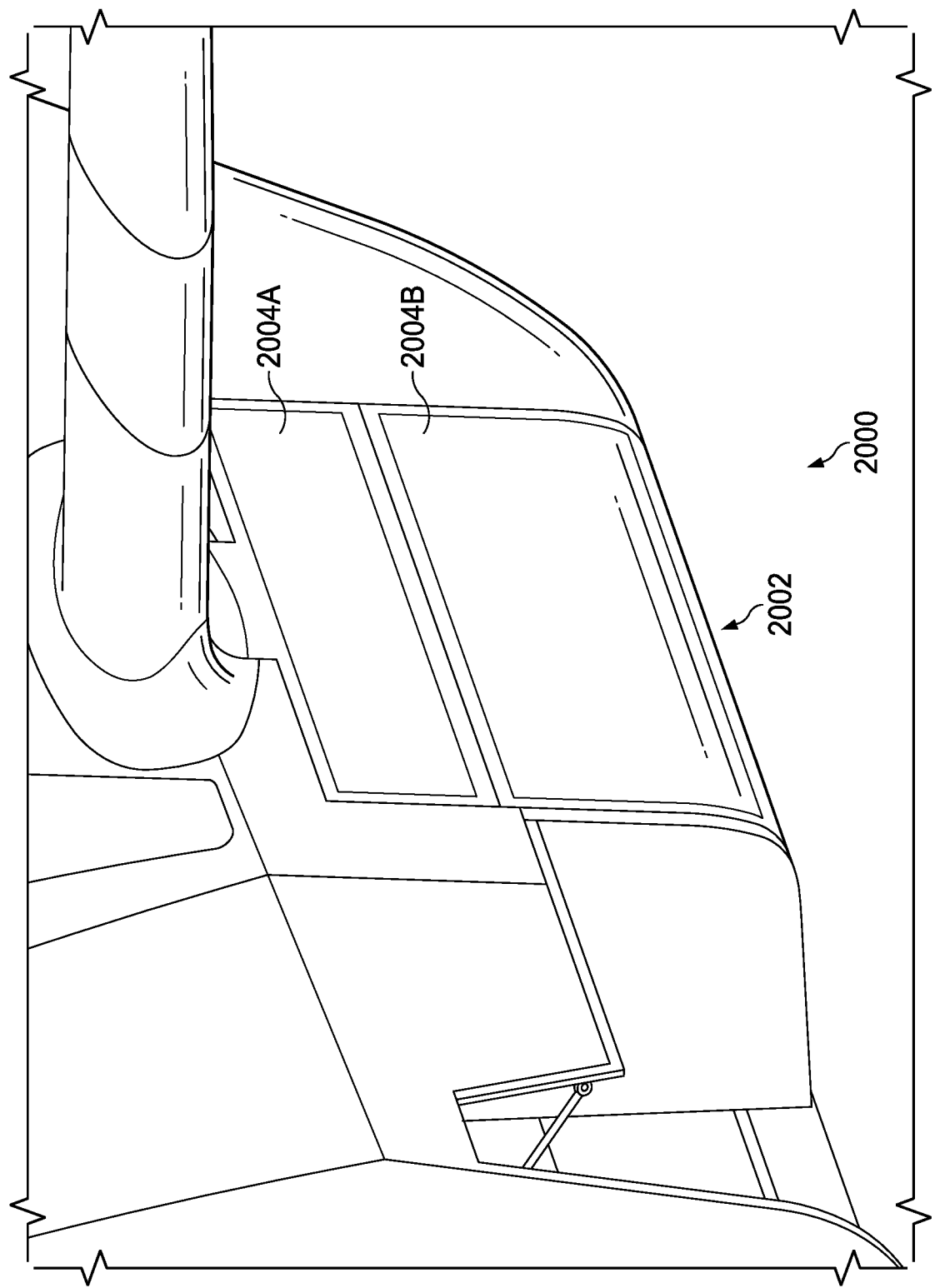
FIGS. 20A-20C illustrate a two doors on a track payload door mechanism for use in connection with a mechanism for implementing internal payload extension and retraction in accordance with embodiments described herein.
Figure 20B:
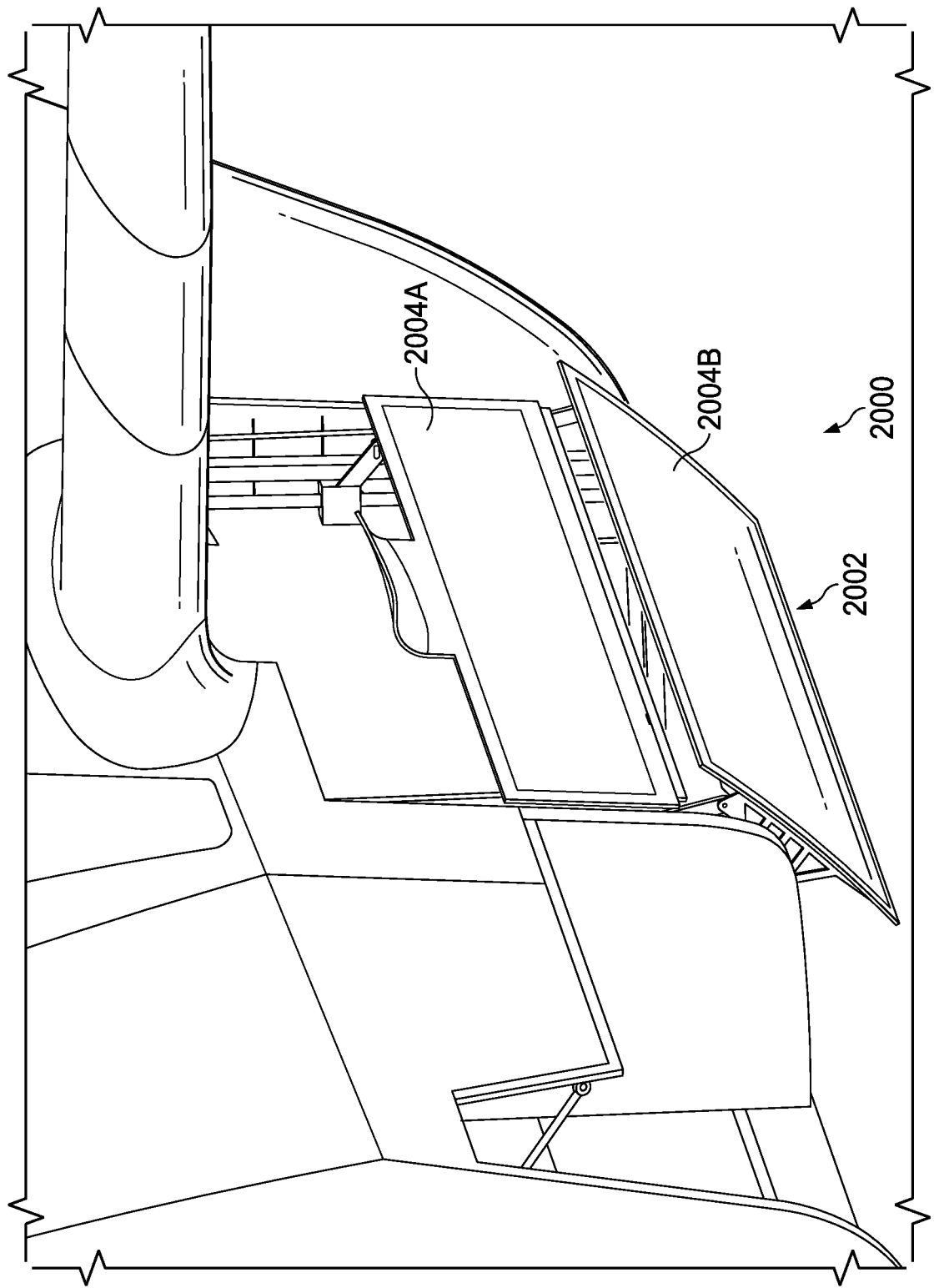
Figure 20C:
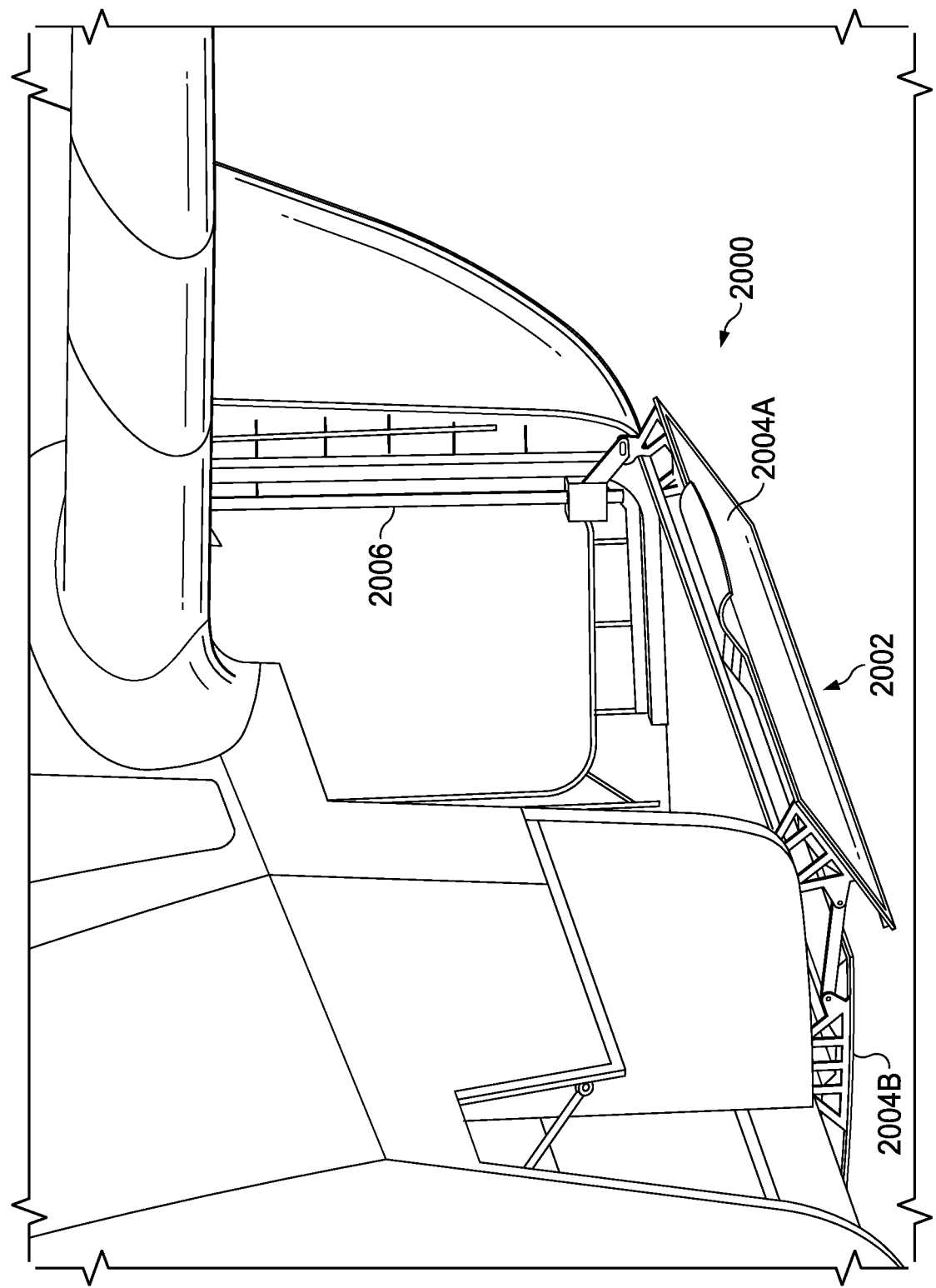

FIGS. 20A-20B illustrate another alternative door design for implementation in connection with embodiments of a payload extension and retraction system described herein. In particular, FIGS. 20A-20C illustrate a two-doors on a track design 2000. As shown in FIGS. 20A-20C, the design 2000 includes a door 2002 comprising two panels 2004A, 2004B, on a shared track 2006 disposed on each side of a payload bay 2008. FIG. 20A illustrates the door 2002 completely closed. FIG. 20B illustrates the door 2002 halfway open. FIG. 20C illustrates the door 2002 completely open.

Figure 21A:
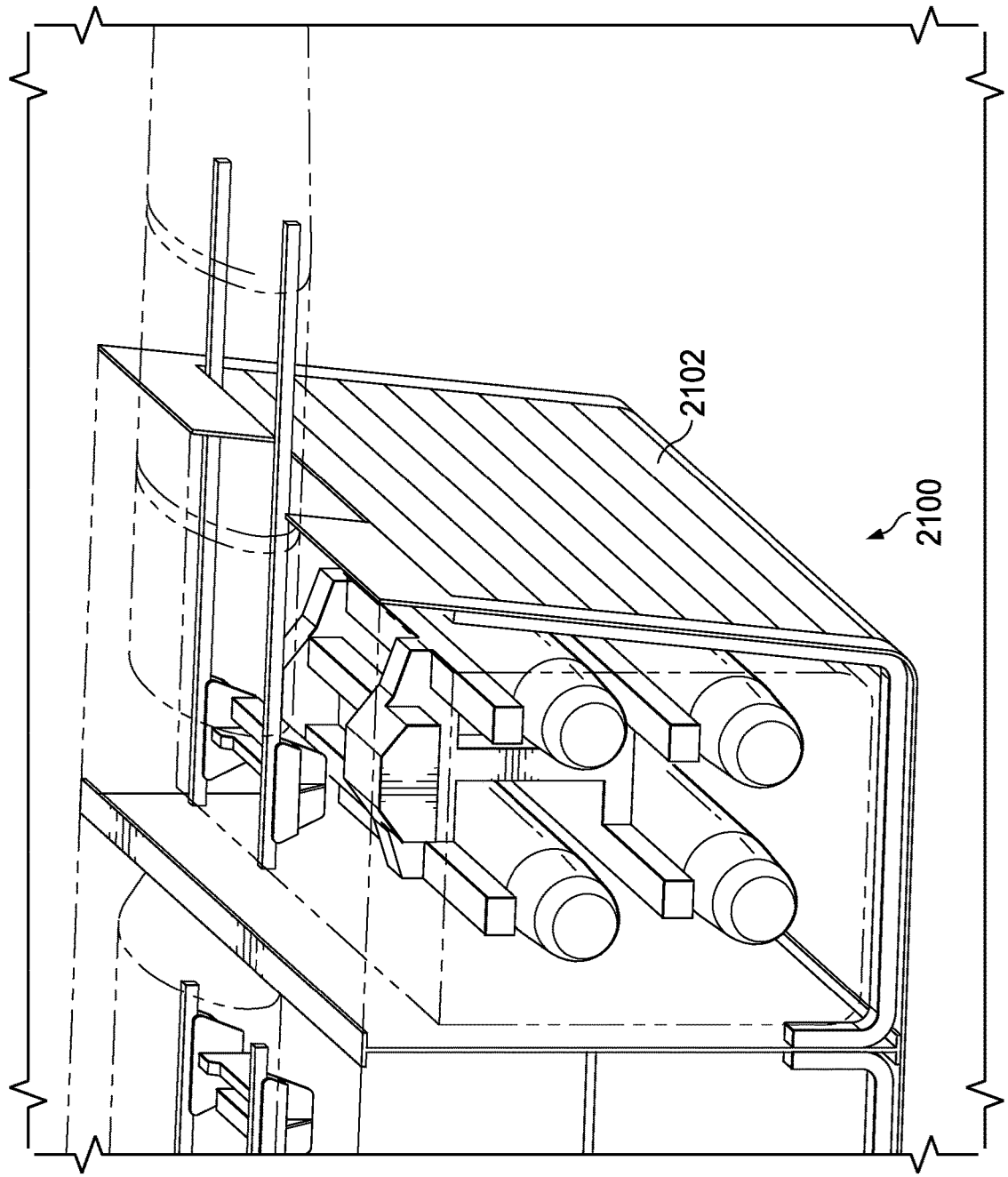
FIGS. 21A-21B illustrate a garage payload door mechanism for use in connection with a mechanism for implementing internal payload extension and retraction in accordance with embodiments described herein.
Figure 21B:
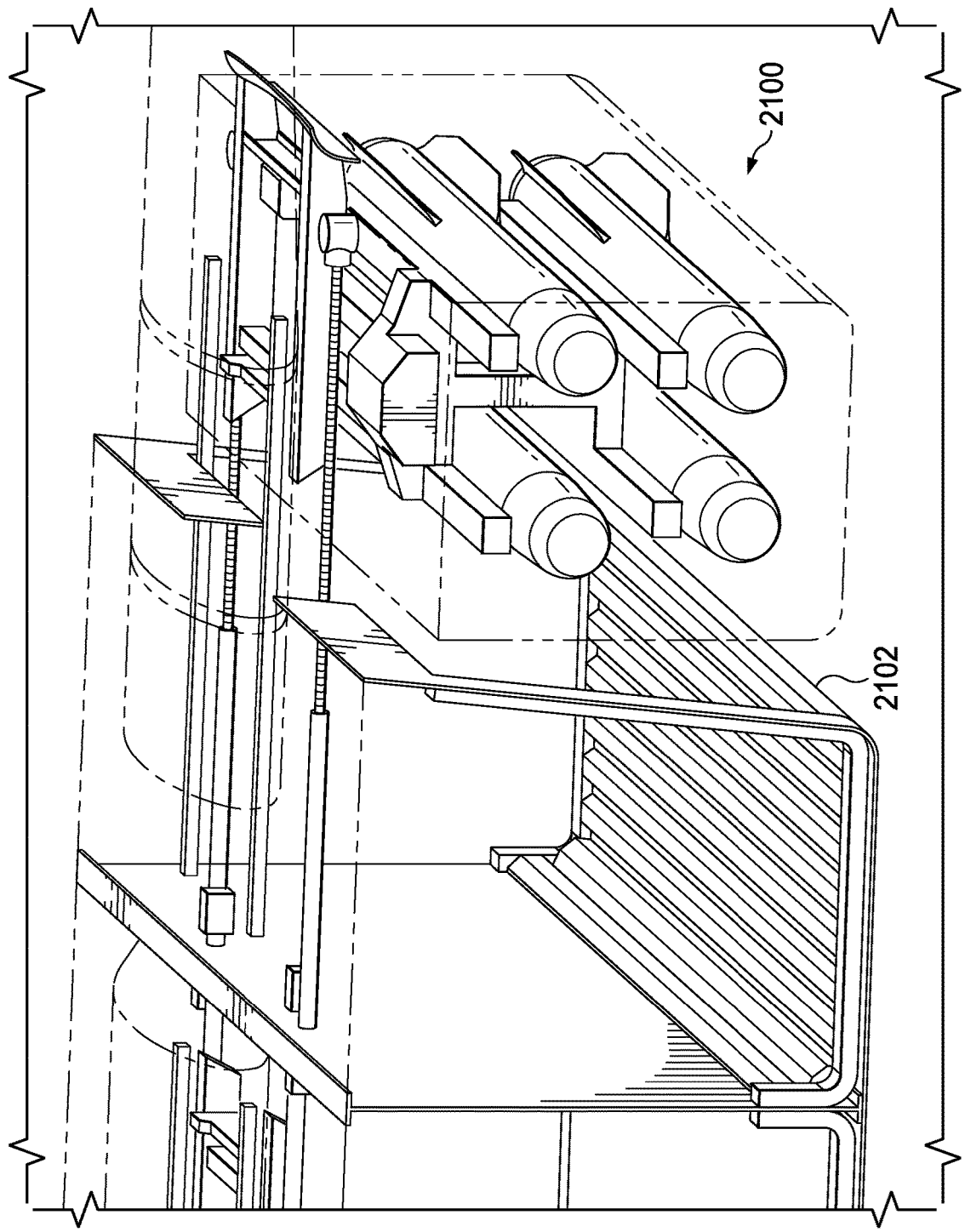

FIGS. 21A-21B illustrate yet another alternative door design for implementation in connection with embodiments of a payload extension and retraction system described herein. In particular, FIGS. 21A-21B illustrate a garage door design 2100. As shown in FIGS. 21A-21B, the design 2100 includes a multi-panel garage door 2102, which may be made of multiple hat stiffened sections 2104. Sections 2104 roll along tracks 2106 disposed on either side of the door 2102 to open/close. FIG. 21A illustrates the door 2102 completely closed and payload 2110 stowed. FIG. 21B illustrates the door 2102 completely open and retracted inside payload bay 2112 and payload 2110 extended.

It will be recognized that different types/arrangements of doors, as described herein, provide different clearances to the payload and/or the ground and require different actuation systems. Additionally, different door arrangements involve different levels of complexity. For example, some require more rollers or moving parts. Some of the configurations enable the door to be closed after the weapons have been extended into the airstream. The decision to use one configuration versus another is dependent on the aircraft and its intended use, as well as the design space of cost, weight, complexity, and development time.

Additionally, it is possible to attach the section of the fuselage through which the payload sweeps to the munitions launcher itself. This configuration eliminates the complexity of a separate mechanism, but it drives loads and other interfaces into the munitions launcher and does not allow the door to be shut with the weapons extended from the fuselage. In such an embodiment, the fuselage panel would be mounted to the munitions launcher and would move out with it when extended. When retracted, the panel would seat against the fuselage frames and longerons at the top and bottom thereof.

Example 1 is a system including at least one track attached to an upper interior surface of a payload bay and extending along a bottom surface of a vehicle structure external to the payload bay, wherein the track comprises a horizontal flange; a rack moveably connected to the at least one track via at least one carrier assembly; and a payload actuator system for selectively extending the rack from the payload bay along the at least one track to a position from which payload carried by the rack may be safely deployed and retracting the rack into the payload bay along the at least one track.

In Example 2, the system of Example 1 may further include a payload bay door and a door actuator system for selectively opening the payload bay door for the rack to be extended from the payload bay and closing the payload bay door once the rack is fully extended.

In Example 3, the system of any of Examples 1 and 2 may further include the door actuator system further selectively closing the payload bay door when the rack is fully retracted into the payload bay.

In Example 4, the system of any of Examples 1-3 may further include the at least one track comprising a forward track and an aft track and the at least one carrier assembly comprising a forward carrier assembly for connecting a forward end of the rack to the forward track and an aft carrier assembly for connecting an aft end of the rack to the aft track.

In Example 5, the system of any of Examples 1-4 may further include the forward and aft tracks each including an inboard lock and an outboard lock and each carrier assembly may further include an inboard striker for engaging a respective one of the inboard locks when the rack is fully retracted into the payload bay and an outboard striker for engaging a respective one of the outboard locks when the rack is fully extended along the tracks.

In Example 6, the system of any of Examples 1-5 may further include each of the inboard and outboard strikers of the forward carrier assembly comprising a conical protrusion for engaging corresponding receptacles of the inboard and outboard locks of the forward track.

In Example 7, the system of any of Examples 1-6 may further include each of the inboard and outboard strikers of the aft carrier assembly comprising a wedge-shaped protrusion for engaging corresponding receptacles of the inboard and outboard locks of the aft track.

In Example 8, the system of any of Examples 1-7 may further include the at least one carrier assembly comprising rollers engaging the horizontal flange of the at least one track for enabling linear translation of the at least one carrier assembly along the at least one track; and brush sweepers for removing debris from a path of the at least one carrier assembly along the at least one track.

In Example 9, the system of any of Examples 1-8 may further include the vehicle structure external to the payload bay comprising an aircraft wing and the at least one track being embedded in a bottom skin of the aircraft wing.

In Example 10, the system of any of Examples 1-9 may further include the rack comprising a bomb rack unit (BRU).

In Example 11, the system of any of Examples 1-10 may further include the rack comprising a munitions launcher.

In Example 12, the system of any of Examples 1-11 may further include the payload comprising air-to-surface weapons.

Example 13 is an aircraft comprising a payload bay for storing payload in a rack; at least one track attached to an upper interior surface of the payload bay and extending along a bottom surface of a wing of the aircraft, wherein the track comprises a horizontal flange and wherein the rack is connected to and linearly translatable along the at least one track via at least one carrier assembly; and a payload actuator system for selectively extending the rack from the payload bay along the at least one track to a position from which payload carried by the rack may be safely deployed and retracting the rack into the payload bay along the at least one track.

In Example 14, the aircraft of Example 13 may further include a payload bay door; and a door actuator system for selectively opening the payload bay door for the rack to be extended from the payload bay and closing the payload bay door once the rack is fully extended.

In Example 15, the aircraft of any of Examples 13-14 may further include the at least one track comprising a forward track and an aft track and the at least one carrier assembly comprises a forward carrier assembly for connecting a forward end of the rack to the forward track and an aft carrier assembly for connecting an aft end of the rack to the aft track.

In Example 16, the aircraft of any of Examples 13-15 may further include the forward track and the aft track each including an inboard lock and an outboard lock and each of the carrier assemblies including an inboard striker for engaging a respective one of the inboard locks when the rack is fully retracted into the payload bay; and an outboard striker for engaging a respective one of the outboard locks when the rack is fully extended along the tracks.

In Example 17, the aircraft of any of Examples 13-16 may further include each of the inboard and outboard strikers of the forward carrier assembly comprises a conical protrusion for engaging corresponding receptacles of the inboard and outboard locks of the forward tracks.

In Example 18, the aircraft of any of Examples 13-17 may further include each of the inboard and outboard strikers of the aft carrier assembly comprises a wedge-shaped protrusion for engaging corresponding receptacles of the inboard and outboard locks of the aft track.

In Example 19, the aircraft of any of Examples 13-18 may further include the at least one carrier assembly further comprising rollers engaging the horizontal flange of the at least one track for enabling linear translation of the at least one carrier assembly along the at least one track; and brush sweepers disposed forward and aft of the rollers to remove debris from a path of the at least one carrier assembly along the track.

Example 20 is a method comprising providing a track along an upper surface of an aircraft payload bay, wherein the track extends from the payload bay along a bottom surface of a wing of the aircraft, the track being embedded in a lower skin of the aircraft wing; moveably connecting a rack carrying payload to the track via a carrier assembly; selectively translating the rack between a first position in which the rack is fully stowed in the payload bay and a second position in which the rack is fully extended along the track beneath the aircraft wing; engaging a first locking mechanism provided between the track and the carrier assembly when the rack is in the first position; and engaging a second locking mechanism provided between the track and the carrier assembly when the rack is in the second position.

The diagrams in the FIGURES illustrate the architecture, functionality, and operation of possible implementations of various embodiments of the present disclosure. It should also be noted that, in some alternative implementations, the function(s) associated with a particular block may occur out of the order specified in the FIGURES. For example, two blocks shown in succession may, in fact, be executed substantially concurrently, or the blocks may sometimes be executed in the reverse order or alternative orders, depending upon the functionality involved.

The embodiments described throughout this disclosure provide numerous technical advantages, including by way of example, maintaining performance at high angles of attack while increasing performance at low angles of attack.

Although several embodiments have been illustrated and described in detail, numerous other changes, substitutions, variations, alterations, and/or modifications are possible without departing from the spirit and scope of the present disclosure, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted. Similarly, methods associated with certain embodiments may be implemented using more, less, and/or other steps than those described herein, and their steps may be performed in any suitable order.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

One or more advantages mentioned herein do not in any way suggest that any one of the embodiments described herein necessarily provides all the described advantages or that all the embodiments of the present disclosure necessarily provide any one of the described advantages. Note that in this Specification, references to various features included in "one embodiment", "example embodiment", "an embodiment", "another embodiment", "certain embodiments", "some embodiments", "various embodiments", "other embodiments", "alternative embodiment", and the like are intended to mean that any such features are included in one or more embodiments of the present disclosure, but may or may not necessarily be combined in the same embodiments.

As used herein, unless expressly stated to the contrary, use of the phrase "at least one of", "one or more of" and "and/or" are open ended expressions that are both conjunctive and disjunctive in operation for any combination of named elements, conditions, or activities. For example, each of the expressions "at least one of X, Y and Z", "at least one of X, Y or Z", "one or more of X, Y and Z", "one or more of X, Y or Z" and "A, B and/or C" can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms "first", "second", "third", etc., are intended to distinguish the particular nouns (e.g., element, condition, module, activity, operation, etc.) they modify. Unless expressly stated to the contrary, the use of these terms is not intended to indicate any type of order, rank, importance, temporal sequence, or hierarchy of the modified noun. For example, "first X" and "second X" are intended to designate two X elements that are not necessarily limited by any order, rank, importance, temporal sequence, or hierarchy of the two elements. As referred to herein, "at least one of", "one or more of", and the like can be represented using the "(s)" nomenclature (e.g., one or more element(s)).

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. An aircraft payload system comprising:
   at least one track attached to an upper interior surface of a payload bay and extending along a bottom surface of a vehicle structure external to the payload bay, wherein the at least one track comprises a horizontal flange;
   a rack moveably connected to the at least one track via at least one carrier assembly; and
   a payload actuator system for selectively extending the rack from the payload bay along the at least one track to a position from which payload carried by the rack is safely deployable and retracting the rack into the payload bay along the at least one track.

2. The system of claim 1 further comprising:
   a payload bay door; and
   a door actuator system for selectively opening the payload bay door for the rack to be extended from the payload bay and closing the payload bay door once the rack is fully extended.

3. The system of claim 2, wherein the door actuator system further selectively closes the payload bay door when the rack is fully retracted into the payload bay.

4. The system of claim 1, wherein the at least one track comprises a forward track and an aft track and the at least one carrier assembly comprises a forward carrier assembly for connecting a forward end of the rack to the forward track and an aft carrier assembly for connecting an aft end of the rack to the aft track.

5. The system of claim 4, wherein the forward track and the aft track each includes an inboard lock and an outboard lock and wherein the forward carrier assembly and the aft carrier assembly each includes:
an inboard striker for engaging a respective one of the inboard locks when the rack is fully retracted into the payload bay; and
an outboard striker for engaging a respective one of the outboard locks when the rack is fully extended along the forward track and the aft track.

6. The system of claim 5, wherein each of the inboard and outboard strikers of the forward carrier assembly comprises a conical protrusion for engaging corresponding receptacles of the inboard and outboard locks of the forward track.

7. The system of claim 5, wherein each of the inboard and outboard strikers of the aft carrier assembly comprises a wedge-shaped protrusion for engaging corresponding receptacles of the inboard and outboard locks of the aft track.

8. The system of claim 1, wherein the at least one carrier assembly comprises:
rollers engaging a top surface of the horizontal flange of the at least one track for enabling linear translation of the at least one carrier assembly along the at least one track; and
brush sweepers disposed forward and aft of the rollers to remove debris from a path of the at least one carrier assembly along the at least one track.

9. The system of claim 1, wherein the vehicle structure external to the payload bay comprises an aircraft wing and wherein the at least one track is embedded in a bottom skin of the aircraft wing.

10. The system of claim 1, wherein the rack comprises a bomb rack unit (BRU).

11. The system of claim 1 wherein the rack further comprises a munitions launcher.

12. The system of claim 1, wherein the payload comprises air-to-surface weapons.

13. An aircraft comprising:
a payload bay for storing payload in a rack;
at least one track attached to an upper interior surface of the payload bay and extending along a bottom surface of a wing of the aircraft, wherein the at least one track comprises a horizontal flange and wherein the rack is connected to and linearly translatable along the at least one track via at least one carrier assembly; and
a payload actuator system for selectively extending the rack from the payload bay along the at least one track to a position from which payload carried by the rack is safely deployable and retracting the rack into the payload bay along the at least one track.

14. The aircraft of claim 13 further comprising:
a payload bay door; and
a door actuator system for selectively opening the payload bay door for the rack to be extended from the payload bay and closing the payload bay door once the rack is fully extended.

15. The aircraft of claim 13, wherein the at least one track comprises a forward track and an aft track and the at least one carrier assembly comprises a forward carrier assembly for connecting a forward end of the rack to the forward track and an aft carrier assembly for connecting an aft end of the rack to the aft track.

16. The aircraft of claim 15, wherein the forward track and the aft track each includes an inboard lock and an outboard lock and wherein the forward carrier assembly and the aft carrier assembly each includes:
an inboard striker for engaging a respective one of the inboard locks when the rack is fully retracted into the payload bay; and
an outboard striker for engaging a respective one of the outboard locks when the rack is fully extended along the forward track and the aft track.

17. The aircraft of claim 16, wherein each of the inboard and outboard strikers of the forward carrier assembly comprises a conical protrusion for engaging corresponding receptacles of the inboard and outboard locks of the forward track.

18. The aircraft of claim 16, wherein each of the inboard and outboard strikers of the aft carrier assembly comprises a wedge-shaped protrusion for engaging corresponding receptacles of the inboard and outboard locks of the aft track.

19. The aircraft of claim 13, wherein the at least one carrier assembly comprises:
rollers engaging the horizontal flange of the at least one track for enabling linear translation of the at least one carrier assembly along the at least one track; and
brush sweepers disposed forward and aft of the rollers to remove debris from a path of the at least one carrier assembly along the at least one track.

20. A method of operating an aircraft payload system, the method comprising:
providing a track along an upper surface of a payload bay of an aircraft, wherein the track extends from the payload bay along a bottom surface of a wing of the aircraft, the track being embedded in a lower skin of the aircraft wing;
moveably connecting a rack carrying payload to the track via a carrier assembly;
selectively translating the rack between a first position in which the rack is fully stowed in the payload bay and a second position in which the rack is fully extended along the track beneath the aircraft wing;
engaging a first locking mechanism provided between the track and the carrier assembly when the rack is in the first position; and
engaging a second locking mechanism provided between the track and the carrier assembly when the rack is in the second position.

* * * * *